US011829656B2

(12) United States Patent
Kashiwagi

(10) Patent No.: US 11,829,656 B2
(45) Date of Patent: Nov. 28, 2023

(54) PRINTING SYSTEM, CONTROL METHOD THEREOF, AND STORAGE MEDIUM

(71) Applicant: CANON KABUSHIKI KAISHA, Tokyo (JP)

(72) Inventor: Masaki Kashiwagi, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/670,807

(22) Filed: Feb. 14, 2022

(65) Prior Publication Data

US 2022/0276812 A1 Sep. 1, 2022

(30) Foreign Application Priority Data

Feb. 26, 2021 (JP) ................................ 2021-030020

(51) Int. Cl.
*G06F 3/12* (2006.01)
*G06T 7/00* (2017.01)

(52) U.S. Cl.
CPC .......... *G06F 3/1208* (2013.01); *G06F 3/1253* (2013.01); *G06T 7/001* (2013.01); *G06T 2200/24* (2013.01); *G06T 2207/30144* (2013.01); *G06T 2207/30168* (2013.01)

(58) Field of Classification Search
CPC ...... G06F 3/1208; G06F 3/1253; G06F 3/122; G06F 3/1244; G06F 3/1282; G06T 7/001; G06T 2200/24; G06T 2207/30144; G06T 2207/30168
USPC ........................................................ 358/1.14
See application file for complete search history.

(56) References Cited

U.S. PATENT DOCUMENTS 6,246,484 B1 * 6/2001 Shimamura ........ H04N 1/00588 358/1.12
2008/0137914 A1 * 6/2008 Minhas ................ H04N 1/6011 382/112
2013/0223866 A1 8/2013 Kazama
2020/0394002 A1 * 12/2020 Blanco Gabella .... G06F 3/1208
2022/0276812 A1 * 9/2022 Kashiwagi ............ G06F 3/1208

FOREIGN PATENT DOCUMENTS

JP 2013171570 A 9/2013

* cited by examiner

*Primary Examiner* — Darryl V Dottin
(74) *Attorney, Agent, or Firm* — ROSSI, KIMMS & McDOWELL LLP

(57) ABSTRACT

A printing system is provided that does not produce a wasteful defective product by suppressing inconsistency in collated pages between a reference image and an inspection image. In a case where a read image obtained by reading an image on a sheet for which print processing has been performed based on a print job is a blank sheet image but a reference image registered in association with the print job is not a blank sheet image, a page of a reference image and a page of the read image are matched with each other by using a blank sheet image registered as a reference image not in association with the print job.

13 Claims, 16 Drawing Sheets

| | |
|---|---|
| Date and time | 3/6 10:10 |
| Job name | Bill |
| Number of inspected sheets | 1,000 sheets |
| Number of sheets having passed | 986 sheets |
| Number of sheets having failed | 14 sheets |

Inspection Results

Previous job ◁ 1st job/3 jobs ▷ Next job

OK

Select a job that is performed. ⌐701

| | Job name | Date of reception |
|---|---|---|
| ☑ | Bill | 20XX/MM/DD |
| ☑ | Estimate | 20XX/MM/DD |
| ☑ | Pamphlet | 20XX/MM/DD |
| ☐ | Decision document | 20XX/MM/DD |
| | | |
| | | |

Next ~702     Cancel ~703

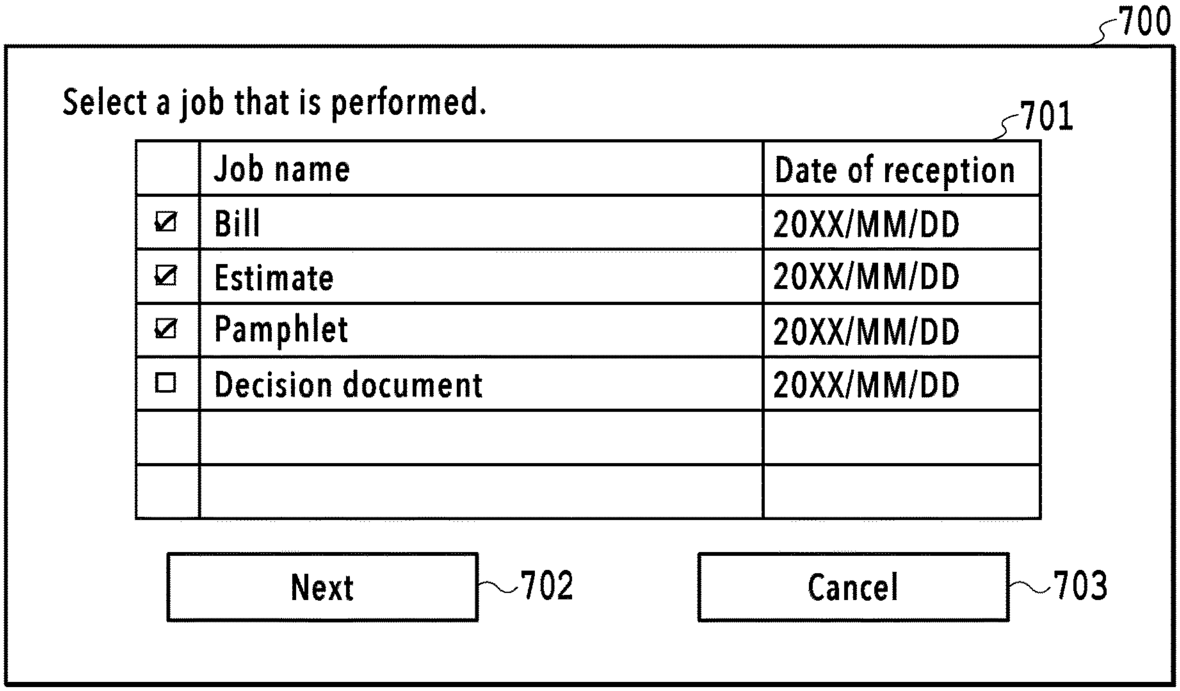

FIG.7A

Inspection Job Setting

Number of copies of job ~712   ~713

| | | |
|---|---|---|
| Bill | 300 copies ▲▼ | Print one copy |
| Estimate | 100 copies ▲▼ | Print one copy |
| Pamphlet | 500 copies ▲▼ | Print one copy |

Feed reference image from inserter ~715

| Discharge destination | Large-capacity stacker | ~714 |
|---|---|---|
| Discharge destination in a case where inspection is failed | Escape tray | |

Start printing ~716     Cancel ~717

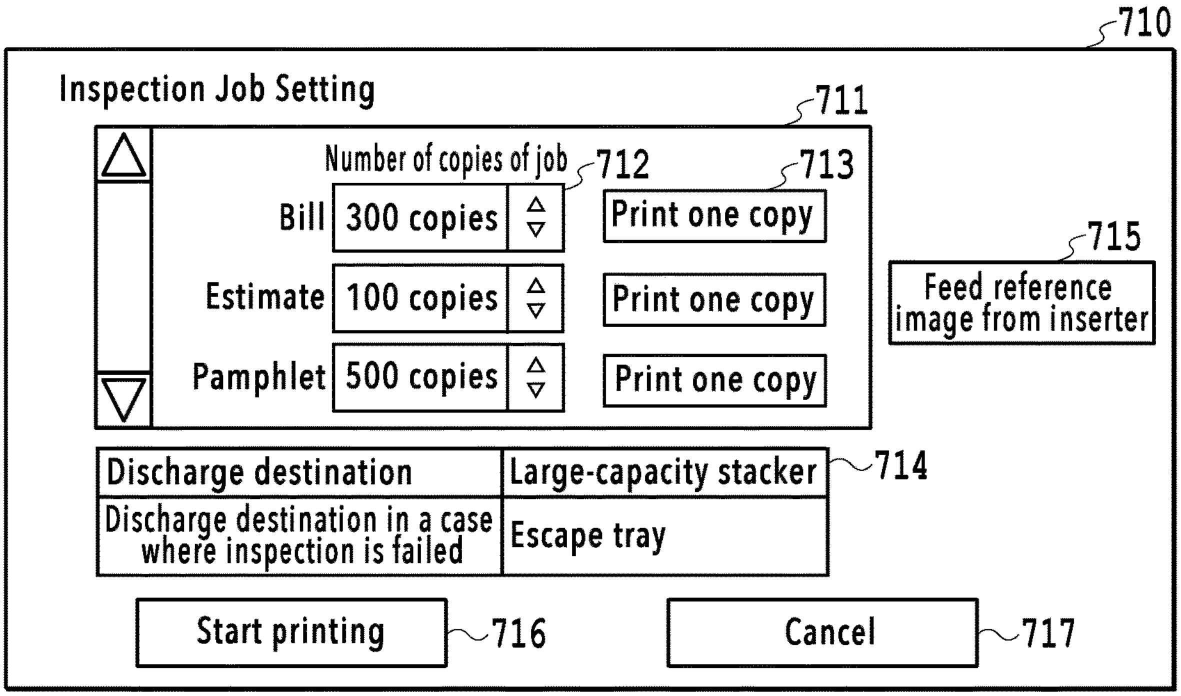

FIG.7B

PRINTING SYSTEM, CONTROL METHOD THEREOF, AND STORAGE MEDIUM

BACKGROUND OF THE INVENTION

Field of the Invention

The present disclosure relates to an inspection technique of print results.

Description of the Related Art

Conventionally, there is a printing system that incorporates an inspection device of inline type capable of print processing while inspecting print results. In the printing system such as this, the presence/absence of a printing defect is determined by comparing an evaluation reference image (reference image) registered in advance and an inspection-target image (inspection image) obtained by optically reading print results. Then, Japanese Patent Laid-Open No. 2013-171570 has disclosed an inspection method that takes into consideration the printing setting, such as multi-page printing, one-sided printing, and doubled-sided printing, in order to establish consistency of the page order between the reference image and the inspection image.

Among printing apparatuses to be incorporated in a printing system, there is a printing apparatus in which the function called blank sheet saving is mounted. This function is a function not to output a blank sheet page for which an object, such as a character and a figure, is not designated in data (PDL data) in which a printing-target document is described for each page. Here, in a case where the setting of the blank sheet saving function in the printing apparatus is different between at the time of registration of a reference image and at the time of execution of print processing accompanied by inspection, inconsistency occurs between pages to be collated in the reference image and the inspection image, and therefore, it is no longer possible to perform appropriate inspection.

SUMMARY OF THE INVENTION

The printing system according to the present disclosure is a printing system including: a printing unit configured to perform print processing for each page based on a print job; and an inspection unit configured to inspect a printing defect of a sheet for which print processing has been performed by collating a read image obtained by reading an image on the sheet for which the print processing has been performed based on the print job and a reference image registered in association with the print job, wherein the printing unit has a function to omit, in a case where a target page of the print processing is a blank sheet page, print processing thereof and in a case where a read image obtained by reading an image on a sheet for which print processing has been performed based on the print job is a blank sheet image but a reference image registered in association with the print job is not a blank sheet image, the inspection unit matches a page of the reference image and a page of the read image with each other by using a blank sheet image registered as a reference image not in association with the print job.

Further features of the present disclosure will become apparent from the following description of exemplary embodiments with reference to the attached drawings.

BRIEF DESCRIPTION OF THE DRAWINGS

FIG. 7A and FIG. 7B are each a diagram showing an example of a UI screen of the external controller;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<System Configuration>

Figure 1:
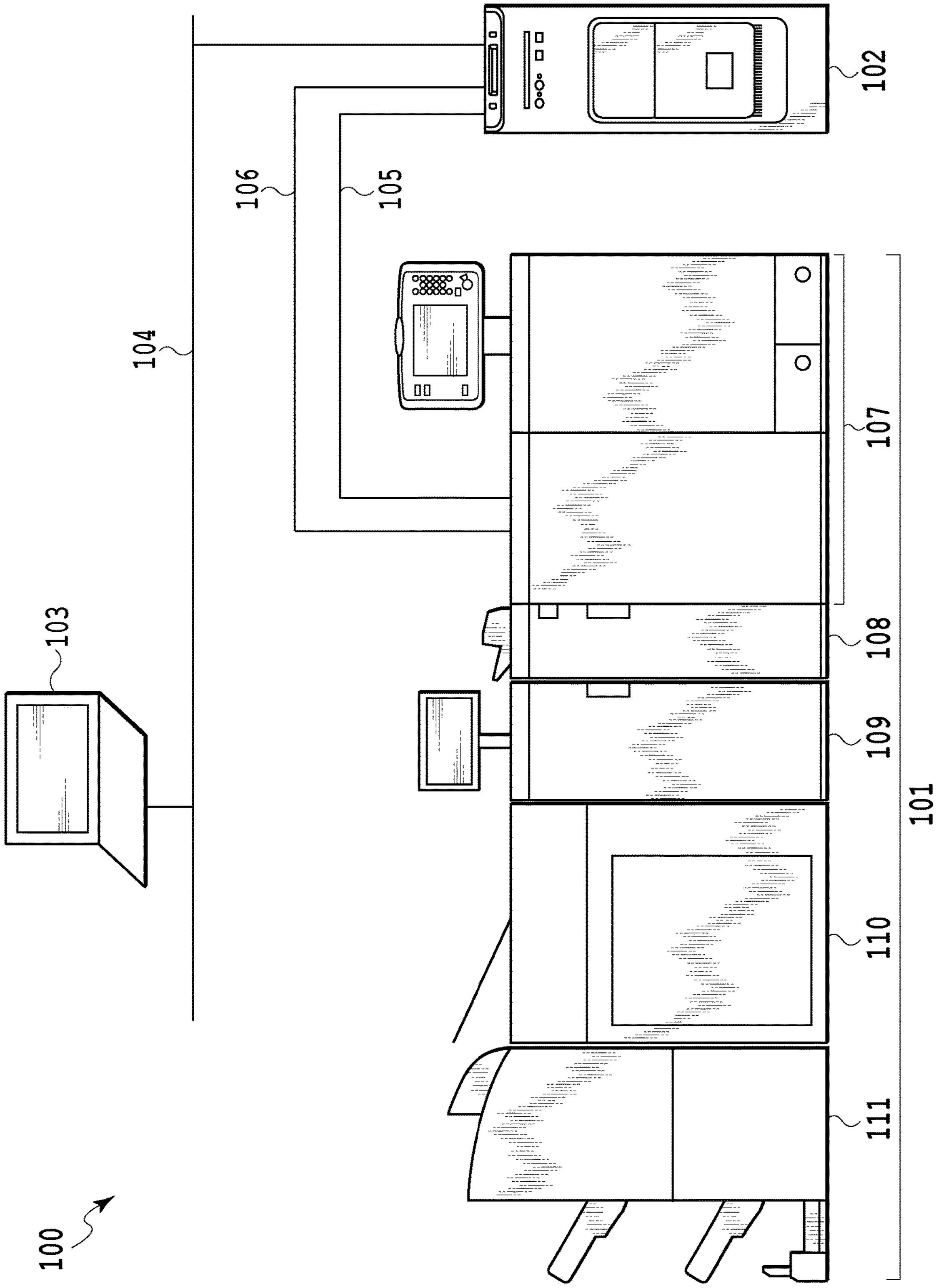
FIG. 1 is a diagram showing an example of a configuration of a printing system.

FIG. 1 is a diagram showing an example of the configuration of a printing system according to the present embodiment. A printing system 100 comprises an image forming apparatus 101 and an external controller 102. The image forming apparatus 101 and the external controller 102 are connected so as to be capable of communication via an internal LAN 105 and a video cable 106. Further, the external controller 102 is connected with a client PC 103 so as to be capable of communication via an external LAN 104.

In the client PC 103, a printer driver having a function to convert print processing-target image data into page description language (PDL) that the external controller 102 can process is installed. It is possible for a user who desires to perform printing to give printing instructions from various applications via the printer driver. The printer driver transmits PDL data to the external controller 102 based on printing instructions from a user. Upon receipt of PDL data from the PC 103, the external controller 102 generates print data (in the following, called "print job"), which the image forming apparatus 101 can process, by performing PDL analysis and rasterizing processing and inputs the print job to the image forming apparatus 101.

Next, the image forming apparatus 101 is explained. The image forming apparatus 101 comprises a printing module 107, an inserter 108, an inspection module 109, a stacker 110, and a finisher 111. In the following, each module is explained.

The printing module 107 forms an image using toner as a printing material for a sheet as a printing medium conveyed from a sheet feed unit 230 in accordance with a print job. The configuration and the operation principle of the printing module 107 are as follows. A laser beam modulated in accordance with an image designated in a print job is reflected by a polygon mirror or the like and a photoconductor drum is irradiated with the laser beam as a scanning beam. An electrostatic latent image formed on the photoconductor drum by the laser beam is developed by toner and a toner image is transferred onto a sheet pasted onto a transfer drum. By performing this series of image forming processes sequentially for the toner of each of yellow (Y), magenta (M), cyan (C), and black (K), a full-color image is formed on the sheet. The sheet on the transfer drum, on which the full-color image is formed, is conveyed to a fixing unit. The fixing unit includes a roller, a belt and the like and internally includes a heat source, such as a halogen heater, within the roller, and dissolves the toner on the sheet on which the full-color image is formed by applying heat and pressure and fixes the toner onto the sheet.

The inserter 108 is a device that inserts a partition sheet or the like for separating a sheet group conveyed after being subjected to the print processing in the printing module 107 at, for example, an arbitrary position.

The inspection module 109 determines whether the image formed on the sheet is normal, that is, determines the presence/absence of a printing defect by reading the image on the conveyed printed sheet and comparing the image with a reference image registered in advance.

The stacker 110 is a large-capacity stacking device capable of stacking printed sheets. The finisher 111 is a postprocessing device having various finishing processing functions, such as stapling, punching, and saddle stitching bookbinding. The finisher 111 performs finishing processing selected and set in advance for the conveyed printed sheet. The sheet after the finishing processing is performed is discharged onto a sheet discharge tray.

The printing system explained in FIG. 1 has the configuration in which a print job is input via the external controller 102, but for example, a configuration that omits the external controller 102 is also possible. That is, the configuration may also be one in which the image forming apparatus 101 is connected to the external LAN 104 and PDL data is transmitted from the client PC 103 to the image forming apparatus 101. In this case, after a print job is generated by performing PDL analysis and rasterizing processing in the image forming apparatus 101, print processing is performed. Further, in the example in FIG. 1, the external controller 102 and the image forming apparatus 101 are connected by the internal LAN 105 and the video cable 106, but any configuration may be accepted as long as it is possible to perform transmission and reception of data necessary for printing. For example, the external controller 102 and the image forming apparatus 101 may be connected by only one of the internal LAN 105 and the video cable 106.

<Internal Configuration of Printing System>

Figure 2:
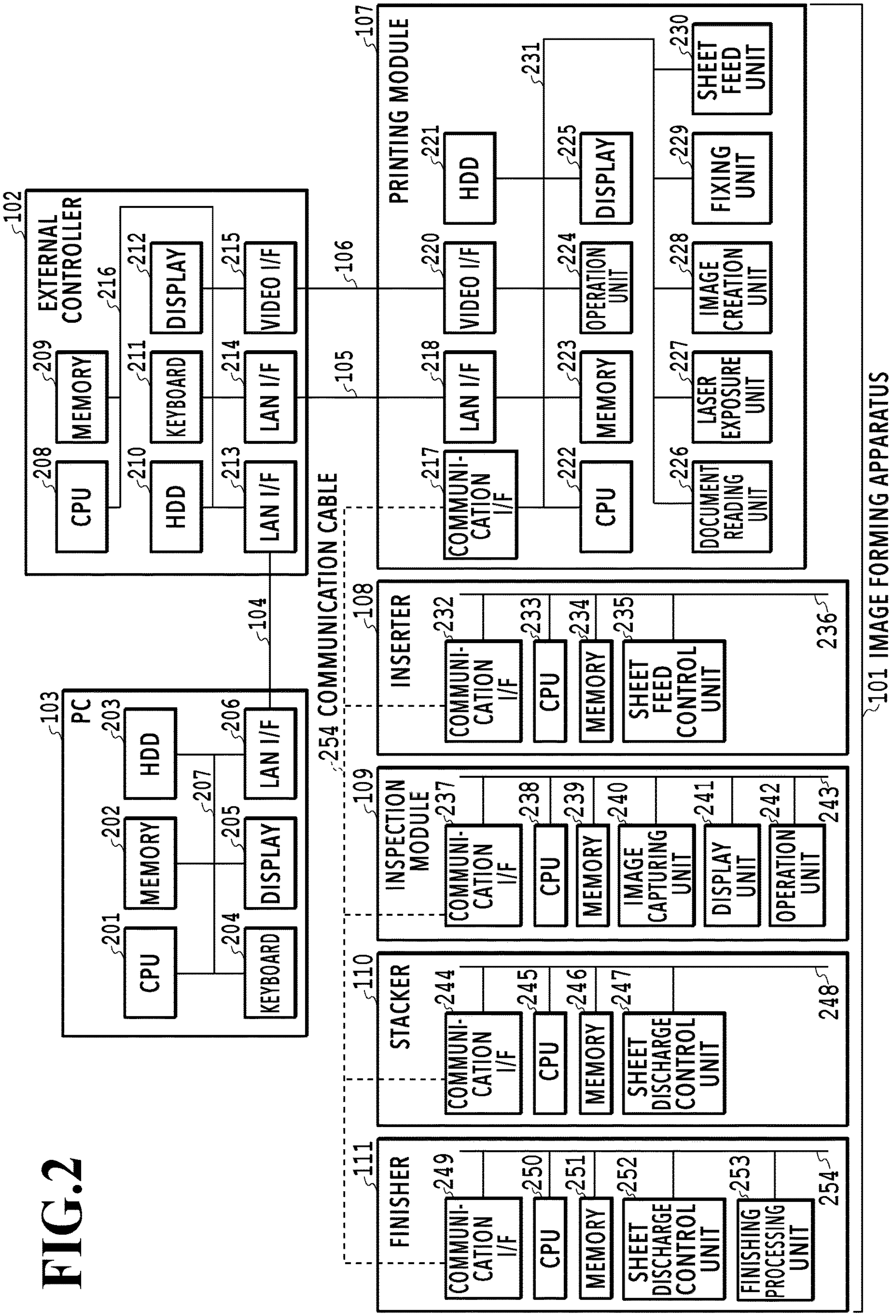
FIG. 2 is a block diagram showing internal configurations of an image forming apparatus and an external controller configuring the printing system and a client PC.

FIG. 2 is a block diagram showing the internal configurations of the image forming apparatus 101 and the external controller 102 configuring the printing system 100 and the client PC 103. In the following, explanation is given in order.

<<Internal Configuration of Image Forming Apparatus>>

First, the internal configuration of the printing module 107 of the image forming apparatus 101 is explained. The printing module 107 has, as components relating mainly to control, a communication I/F 217, a LAN I/F 218, a video I/F 220, an HDD 221, a CPU 222, a memory 223, an operation unit 224, and a display 225. Further, the printing module 107 has, as components relating mainly to image formation, a document reading unit 226, a laser exposure unit 227, an image creation unit 228, a fixing unit 229, and the sheet feed unit 230. Each component is connected via a system bus 231. The communication I/F 217 is connected with the inserter 108, the inspection module 109, the stacker 110, and the finisher 111 via a communication cable 254 and communication is performed for controlling each device. The LAN I/F 218 is connected with the external controller 102 via the internal LAN 105 and communication of print data and the like is performed. The video I/F 220 is connected with the external controller 102 via the video cable 106 and communication of image data and the like is performed. The HDD 221 is a storage device in which programs and data are stored. The CPU 222 centralizedly controls the printing module 107 based on programs and the like stored in the HDD 221. In the memory 223, programs and image data that are necessary at the time of the CPU 222 performing various kinds of processing and the memory 223 operates as a work area. The operation unit 224 receives inputs of various settings and operation instructions from a user via, for example, a graphical user interface. The display 225 displays information on various settings relating to print processing, the processing status of a print job, and the like. The document reading unit 226 is a scanner device that optically reads a document at the time of using the copy function and the scan function. The document reading unit 226 optically reads an image on a document by capturing the image with a CCD camera while illuminating the sheet placed by a user with an exposure lamp and generates image data. The laser exposure unit 227 is a device that performs primary charging and laser exposure for irradiation of a laser beam. The laser exposure unit 227 first performs primary charging that charges the photoconductor drum surface to a uniform minus potential. Next, the laser exposure unit 227 irradiates the photoconductor drum with the laser beam by a laser driver while adjusting the reflection angle with a polygon mirror. Due to this, the minus charges at the irradiated portion are neutralized and an electrostatic latent image is formed. The image creation unit 228 is a device for transferring toner onto the sheet. The image creation unit 228 includes a developing unit, a transfer unit, a toner replenishment unit and the like, which are not shown schematically, and transfers the toner on the photoconductor drum onto the sheet. The developing unit attaches the negatively charged toner from a development cylinder to the electrostatic latent image on the photoconductor drum surface and visualizes the electrostatic latent image. The transfer unit performs primary transfer that transfers the toner on the photoconductor drum surface onto a transfer belt by applying a plus potential to a primary transfer roller and secondary transfer that transfers the toner on the transfer belt onto the sheet by applying a plus potential to a secondary transfer roller. The fixing unit 229 is a device that dissolves and fixes the toner on the sheet onto the sheet by applying heat and pressure and includes a heating heater, a fixing belt, a pressure belt and the like, which are not shown schematically. The sheet feed unit 230 is a device for feeding a sheet that is subjected to print processing. The sheet feed unit 230 performs the sheet feeding operation and the conveyance operation of a sheet by a roller and various sensors, which are not shown schematically.

Next, the internal configuration of the inserter 108 of the image forming apparatus 101 is explained. The inserter 108 includes a communication I/F 232, a CPU 233, a memory 234, and a sheet feed control unit 235 and each component is connected via a system bus 236. The communication I/F 232 is connected with the printing module 107 via the communication cable 254 and performs communication necessary for sheet insertion control. The CPU 233 controls the entire inserter 108 in accordance with control programs stored in the memory 234. The memory 234 is a storage device in which control programs are stored. The sheet feed control unit 235 controls the intake of a sheet placed on a tray 321, the sheet feed from a sheet feed unit, not shown schematically, and the conveyance of a sheet conveyed from the printing module 107 while controlling a roller and a sensor, which are not shown schematically, based on instructions from the CPU 233.

Next, the internal configuration of the inspection module 109 of the image forming apparatus 101 is explained. The inspection module 109 includes a communication I/F 237, a CPU 238, a memory 239, an image capturing unit 240, a display unit 241, and an operation unit 242 and each component is connected via a system bus 243. The communication I/F 237 is connected with the printing module 107 via the communication cable 254 and performs communication necessary for control, such as inspection of a printed sheet. The CPU 238 controls the entire inspection module 109 in accordance with control programs stored in the memory 239. The memory 239 is a storage device that stores various kinds of setting information and image data, in addition to control programs. The image capturing unit 240 reads the image on a printed sheet that is conveyed by image capturing based on instructions of the CPU 238. In the present embodiment, the image on a sheet is read by performing image capturing with a camera, but for example, it may also be possible to read the image with an inline scanner or the like. The CPU 238 compares the inspection-target captured image (inspection image) obtained by the image capturing unit 240 and the reference image stored in advance in the memory 239 and determines whether there is a defect in the print results. On the display unit 241, the inspection results, the setting screen and the like are displayed. The operation unit 242 receives user instructions to change the setting of the inspection module 109, to register a reference image, and so on via, for example, a graphical user interface.

Next, the internal configuration of the stacker 110 of the image forming apparatus 101 is explained. The stacker 110 includes a communication I/F 244, a CPU 245, a memory 246, and a sheet discharge control unit 247 and each component is connected via a system bus 248. The communication I/F 244 is connected with the printing module 107 via the communication cable 254 and performs communication necessary for sheet stacking and sheet discharge control. The CPU 245 controls the entire stacker 110 in accordance with control programs stored in the memory 246. The memory 246 is a storage device in which control programs are stored. The sheet discharge control unit 247 performs control for conveying a conveyed sheet to a stack tray, an escape tray, or the subsequent finisher 111 based on instructions from the CPU 245.

Next, the internal configuration of the finisher 111 of the image forming apparatus 101 is explained. The finisher 111 includes a communication I/F 249, a CPU 250, a memory, 251, a sheet discharge control unit 252, and a finishing processing unit 253 and each component is connected via the system bus 254. The communication I/F 249 is connected with the printing module 107 via the communication cable 254 and performs communication necessary for control of finishing processing. The CPU 250 controls the entire finisher 111 in accordance with control programs stored in the memory 251. The memory 251 is a storage device in which control programs are stored. The sheet discharge control unit 252 controls sheet conveyance and sheet discharge based on instructions from the CPU 250. The finishing processing unit 253 performs processing, such as stapling, punching, and saddle stitching bookbinding, based on instructions from the CPU 250.

<<Internal Configuration of External Controller>>

Next, the internal configuration of the external controller 102 is explained. The external controller 102 includes a CPU 208, a memory 209, an HDD 210, a keyboard 211, a display 212, a LAN I/F 213, a LAN I/F 214, and a video I/F 215 and each component is connected via a system bus 216. The CPU 208 performs processing, such as reception of PDL data from the client PC 103, RIP processing, and transmission of a print job to the image forming apparatus 101, based on programs and data stored in the HDD 210. The memory 209 stores programs and data necessary at the time of the CPU 208 performing various kinds of processing and operates as a work area. The HDD 210 stores programs and data necessary for the operation, such as PDL analysis and RIP processing. The keyboard 211 is an input device for a user to input various operations and instructions to the external controller 102. On the display 212, information on an application being executed by the external controller 102 and the like is displayed in a still image or in a moving image. The LAN I/F 213 is connected with the client PC 103 via the external LAN 104 and reception of PDL data and the like are performed. The LAN I/F 214 is connected with the image forming apparatus 101 via the internal LAN 105 and transmission of a print job and the like are performed. The video I/F 215 is connected with the image forming apparatus 101 via the video cable 106 and transmission and reception of image data and the like are performed.

<<Internal Configuration of Client PC>>

Next, the internal configuration of the client PC 103 is explained. The client PC 103 includes a CPU 201, a memory 202, an HDD 203, a keyboard 204, a display 205, and a LAN I/F 206 and each component is connected via a system bus 207. The CPU 201 creates image data that is the print processing target and gives printing instructions based on a document creation program or the like stored in the HDD 203. Further, the CPU 201 comprehensively controls each device connected to the system bus 207. The memory 202 stores programs and data necessary at the time of the CPU 201 performing various kinds of processing and operates as a work area. The HDD 203 stores programs and data necessary for the operation, such as print processing. The keyboard 204 is an input device for a user to input various operations and instructions to the client PC 103. On the display 205, information on an application or the like being executed by the client PC 103 is displayed in a still image or in a moving image. The LAN I/F 206 is connected with the external LAN 104 and transmission of PDL data and the like are performed.

Each of the memory 202, the memory 209, the memory 223, the memory 234, the memory 239, the memory 246, and the memory 251 shown in FIG. 2 is only required to be a storage device for storing data and programs. For example, the configuration may be one replaced with a volatile RAM, a nonvolatile ROM, a built-in HDD, an external HDD, a USB memory or the like.

<Conveyance System of Image Forming Apparatus>

Figure 3:
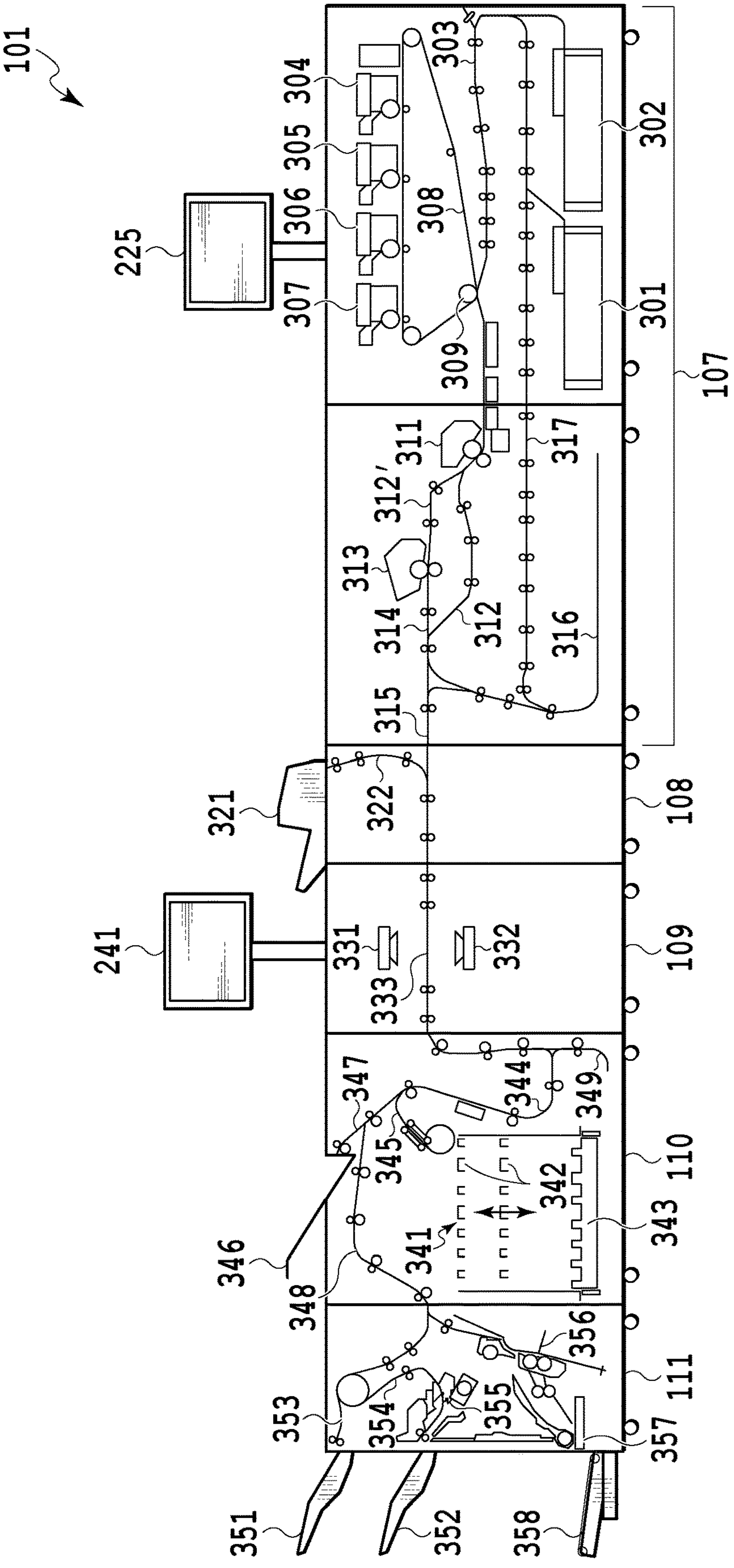
FIG. 3 is a cross-sectional diagram of a mechanism of the image forming apparatus.

Following the above, the conveyance system of the image forming apparatus 101 is explained. FIG. 3 is a cross-sectional diagram of the mechanism of the image forming apparatus 101. In the following, explanation is given along FIG. 3.

The printing module 107 comprises sheet feed decks 301 and 302. It is possible to store various sheets in each of the sheet feed decks 301 and 302. The sheet feed decks 301 and 302 separate only one sheet located at the uppermost position of the stored sheets and convey the sheet to a sheet conveyance path 303. Each of development stations 304 to 307 forms a toner image by using colored toner of Y, M, C, or K. The formed toner image is first transferred primarily onto an intermediate transfer belt 308. Then, the intermediate transfer belt 308 rotates clockwise in FIG. 3 and at a secondary transfer position 309, the toner image is transferred onto the sheet conveyed from the sheet conveyance path 303. On the display device 225, the processing status of a print job and information for various settings are displayed. A fixing unit 311 comprises a pressure roller and a heating roller and fixes the toner image onto the sheet by causing the sheet to pass between each roller to fuse and fix the toner. The sheet that exits the fixing unit 311 is conveyed to a sheet conveyance path 315 through a sheet conveyance path 312. In a case where the sheet is a sheet type that further requires fusion and fixing to fix the toner image, after passing through the fixing unit 311, the sheet is conveyed to a second fixing unit 313 through a sheet conveyance path 312' located above the sheet conveyance path 312. The sheet for which additional fusion and fixing have been performed in the second fixing unit 313 is conveyed to the sheet conveyance path 315 through a sheet conveyance path 314. Here, in a case where the setting of the print mode is set to double-sided printing, the sheet is conveyed to a sheet reversing path 316 and after being reversed, the sheet is conveyed to a double-sided conveyance path 317. Then, at the secondary transfer position 309, image transfer onto the second side is performed.

In a case where the number of sheets that are conveyed to the inserter 108 through the sheet conveyance path 315 reaches a predetermined number of sheets, the inserter 108 merges a partition sheet fed through a sheet conveyance path 322 with the conveyance path. Due to this, it is made possible to insert the partition sheet into a series of sheet groups conveyed from the printing module 107 at arbitrary timing and convey them to the subsequent device. The sheet having passed through the inserter 108 is conveyed to the inspection module 109. Within the inspection module 109, a first camera 331 and a second camera 332 are arranged so as to face each other. The first camera 331 captures the front side of the sheet and second camera 332 captures the back side of the sheet. The inspection module 109 reads both sides of the sheet by using the first camera 331 and the second camera 332 at the timing at which the sheet conveyed to a sheet conveyance path 333 reaches a predetermined position and inspects whether there is a defect in the read image of the inspection-target side. On the display device 241, results of the inspection performed by the inspection module 109, and the like are displayed. The inspected sheet is conveyed to the stacker 110.

The stacker 110 has a stack tray 341 for stacking sheets. The sheet having passed through the inspection module 109 is conveyed to the stacker 110 through a sheet conveyance path 344. The sheet conveyed from the sheet conveyance path 344 via a sheet conveyance path 345 is flipped and stacked on the stack tray 341. The stacker tray 341 includes a lifting and lowering tray 342 and an eject tray 343. Further, the stacker 110 has an escape tray 346 as a sheet discharge tray. The escape tray 346 is a sheet discharge tray for discharging a sheet determined to have a printing defect (image fault) by the inspection module 109. In a case where a sheet is discharged onto the escape tray 346, the sheet is conveyed from the sheet conveyance path 344 to the escape tray 346 via a sheet conveyance path 347. In a case where a sheet is conveyed to the finisher 111 in the subsequent stage of the stacker 110, the sheet is conveyed via a sheet conveyance path 348. A reversing unit 349 is used without fail in a case where the sheet discharge destination of a sheet is switched to another in accordance with the inspection results in the inspection module 109. The reason is to gain time for reading images on the sheet with the two cameras 331 and 332 and inspecting the read images and switching the conveyance path to the sheet conveyance path 345 or 348. In a case inspection is not performed, the reversing unit 349 is used only in a case where the sheet is flipped at the time of stacking the sheet onto the stack tray 341. The sheet for which no image fault has been detected as a result of the inspection by the inspection module 109 is conveyed to the finisher 111.

In the finisher 111, for the conveyed sheet, finishing processing, such as stapling (one-portion/two-portion stapling), punching (two-hole/three-hole punching), and saddle stitching bookbinding, is performed. The finisher 111 comprises two sheet discharge trays 351 and 352. The sheet conveyed via a sheet conveyance path 353 is discharged onto the sheet discharge tray 351. However, it is not possible to perform the finishing processing, such as stapling, in the sheet conveyance path 353. In a case where the finishing processing, such as stapling, is performed, the sheet is conveyed to a processing mechanism 355 via a sheet conveyance path 354. Then, after the finishing function designated by a user is performed in the processing mechanism 355, the sheet is discharged onto the sheet discharge tray 352. It is possible for each of the sheet discharge trays 351 and 352 to lift and lower. It is also possible to cause the operation to be performed so that the sheet discharge tray 351 is lowered the sheet for which the finishing processing has been performed in the first processing mechanism 355 is stacked onto the sheet discharge tray 351. Further, in a case where saddle stitching bookbinding is designated of the finishing function, after the stapling processing is performed at the sheet center in a second processing mechanism 356, the sheet is folded in two and discharged onto a saddle stitching bookbinding tray 358 via a sheet conveyance path 357. The saddle stitching bookbinding tray 358 has a belt conveyer configuration and the configuration is such that a sheet bundle (saddle stitching bookbinding bundle) stacked on the saddle stitching bookbinding tray 358 is conveyed to the left side.

<Details of Inspection Module>

Following the above, the method of using the inspection module 109 is explained in detail, such as various kinds of setting work that a user should perform for the inspection module 109 before starting inspection processing. The inspection module 109 inspects a printed sheet which has been conveyed in accordance with inspection items set in advance. The inspection is performed by comparing the read image (inspection image) corresponding to the inspection-target side of the read images of both sides of the sheet obtained by capturing the printed sheet and the reference image registered in advance in association with the sheet side indicating one of the obverse side and the reverse side. As the image comparison method, there are a method of comparing the pixel values for each corresponding position in both images, a method of comparing the object positions by edge detection, a method of comparing recognition results by character recognition processing (OCR), and the like.

Figure 4A:
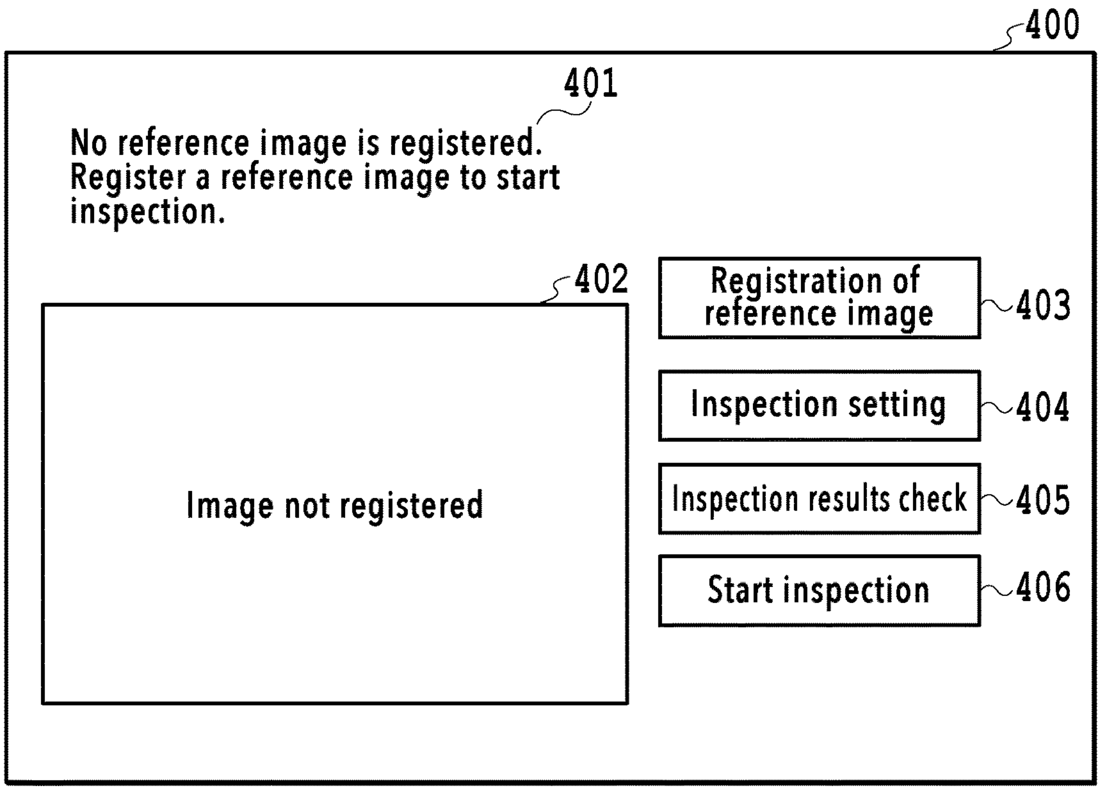
FIG. 4A and FIG. 4B are each a diagram showing an example of a UI screen of the image forming apparatus (inspection module)

On an inspection menu screen 400 shown in FIG. 4A, in a message field 401 located at the top left, a message to the effect that a reference image is not registered yet and a message to the effect that registration of a reference image is necessary prior to the start of inspection processing are displayed. In a case where a reference image is already registered at the point in time of activation, a message to the effect that it is possible to start inspection processing is displayed. Under the message field 401 is an image display area 402 in which a reference image is displayed. In the example in FIG. 4A, a reference image is not registered yet, and therefore, a character string of "Image not registered" is displayed. The display in a case where a reference image is registered will be described later. On the right side on the inspection menu screen 400, four buttons 403 to 406 are arranged one on top of another. The button 403 is a button for calling a UI screen for performing registration of a reference image. As described previously, the reference image is an image that is used as a reference at the time of determining whether there is a defect in an inspection image. The button 404 is a button for calling a UI screen for setting conditions at the time of inspection. A user sets an inspection item and an inspection accuracy in accordance with the purpose of inspection. Here, as the inspection items, there are shift in printing position, tint of image, density of image, streak and thin spot, print omission and the like. Further, the inspection accuracy is an index to determine the magnitude of the difference from the reference image, by which it is determined that there is a defect, and is specified by a numerical value, for example, such as within 1%. The button 405 is a button for calling a UI screen for checking inspection results. It is possible for a user to check the past inspection contents and the inspection results on an inspection results check screen. The button 406 is a button for giving instructions to start inspection. In a case where the pressing down of the button 406 is detected, the inspection module 109 makes a transition into the inspection mode, notifies the printing module 107 that the inspection module 109 is in the inspection mode, and starts inspection of a printed sheet that is conveyed sequentially. The configuration of the inspection menu screen 400 shown in FIG. 4A is an example and it may also be possible to design a configuration so that information other than that described above, for example, information relating to the setting of inspection, such as the partition sheet setting, is displayed.

<<Registration of Reference Image>>

Figure 5A:
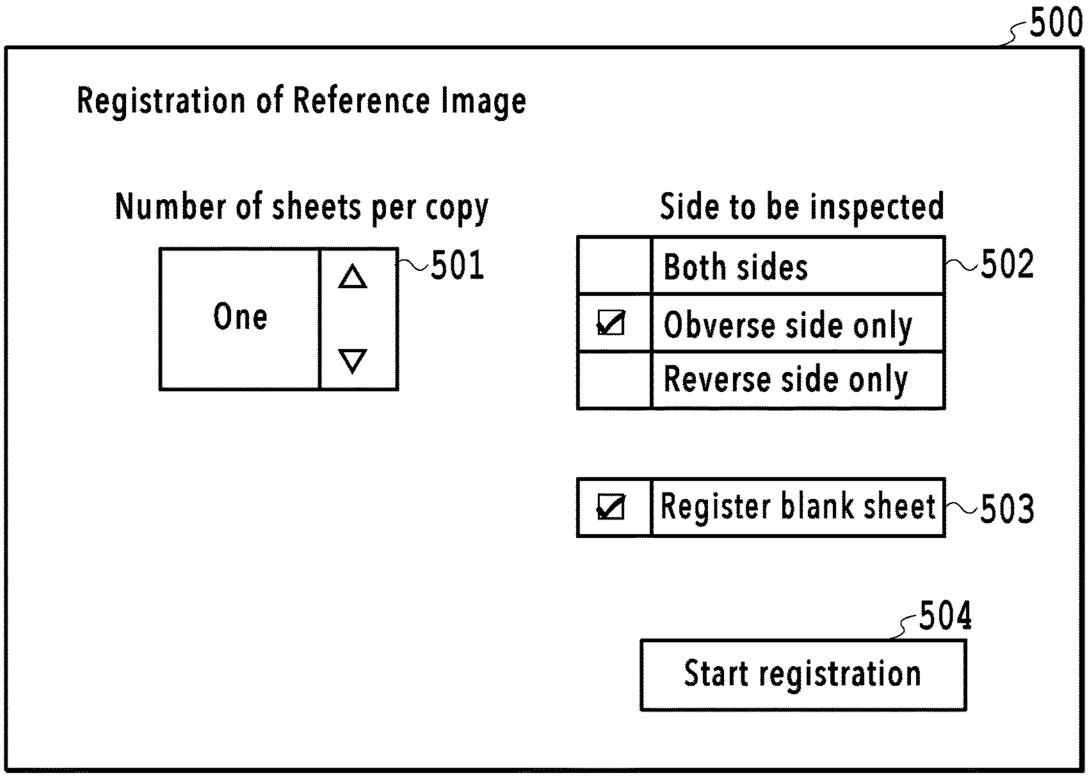
FIG. 5A and FIG. 5B are each a diagram showing an example of a UI screen of the image forming apparatus (inspection module)
Figure 5B:
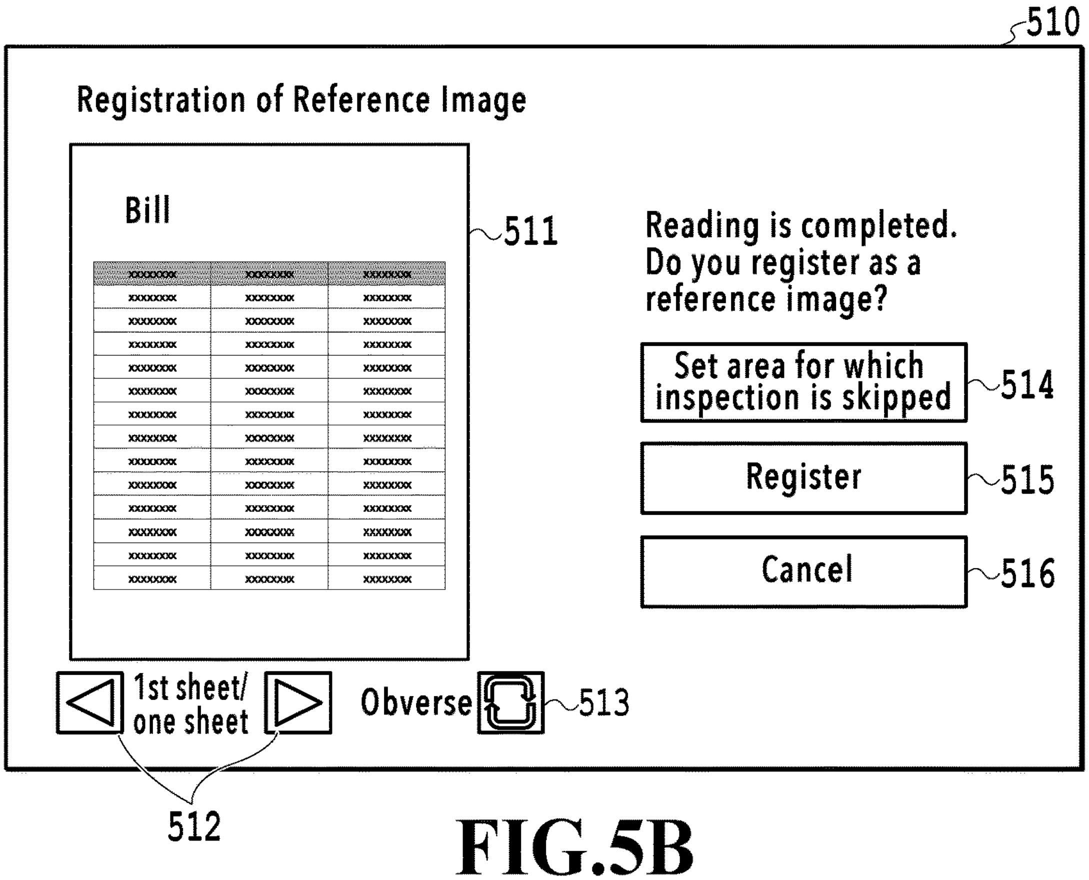

On the above-described inspection menu screen 400, in a case where a user presses down the button 403, a UI screen (in the following, called "image registration screen") for registering a reference image as shown in FIG. 5A is first displayed on the display unit 241. On an image registration screen 500 shown in FIG. 5A, three setting areas 501 to 503 and one button 504 exist. The setting area 501 is an area for setting the number of sheets per copy of a print job accompanied by inspection processing (in the following, called "inspection job"). It is possible for a user to designate a desired number of sheets by operating a spin button within the setting area 501. However, in a case where the checkbox in the setting area 503, to be described later, is checked, the number of sheets per copy is compulsorily set to one. The setting area 502 is an area for setting the inspection-target side of a sheet. It is possible to set to perform inspection for both sides of a sheet or only for one side (at this time, only for the obverse side or only for the reverse side). Even in a situation in which printing is performed only for one side, there is a case where the inspection condition is set so that inspection of both sides is performed in order to inspect that there is no dust attached to the side that is not printed. The setting area 503 is used in a case where an image of a blank sheet in which an object to be drawn does not exist is registered as a reference image. In a case where the "Start registration" button 504 is pressed down in the state where the checkbox within the setting area 503 is checked, the image (blank sheet image) obtained by reading the blank sheet is registered as a reference image not in association with a specific job. Although not shown schematically here, it may also be possible to enable registration of a blank sheet image in association with the sheet size and the sheet type by separately providing a detailed-setting area for designating the sheet size, such as A4 and A3, and the sheet type, such as plain paper and glossy paper. The button 504 is a button for starting processing to read an image from a sample sheet and register it as a reference image. In a case where the button 504 is pressed down, the inspection module 109 makes a transition into a reference image registration mode, notifies the printing module 107 that the inspection module 109 is in the reference image registration mode, and reads the image of the sample sheet that is conveyed. Then, the inspection module 109 stores the read image in association with a barcode printed on a sheet (job switching sheet) for switching reference images for each job. The job switching sheet will be described later. FIG. 5B is an example of a UI screen (registration processing screen) prompting registration of a reference image and setting of related items, which is displayed on the display unit 241 of the inspection module 109 after reading of the sample sheet is completed. On the left side on a registration processing screen 510, an image display area 511 in which the read image of the sample sheet is displayed exists and further, under the image display area 511, buttons 512 for switching sheets to be displayed in a case where one copy consists of a plurality of sheets and a button 513 for switching display between the obverse side and the reverse side of a sheet exist. It may also be possible to design the button 512 so that the button 512 is not displayed in a case where the number of sheets per copy, which is set on the image registration screen 500, is one. Similarly, it may also be possible to design the button 513 so that the button 513 is not displayed in a case where the inspection-target side that is set on the image registration screen 500 is only the one side. On the right side on the registration processing screen 500, three buttons 514 to 516 are arranged one on top of another. The button 514 is a button for setting an area (inspection skip area) for which comparison with the inspection image of the reference images is not performed. This inspection skip area setting is used in a case where the inspection-target area is limited. For example, mention is made of a case of Variable Data Printing (VDP) in which print contents are changed for a specific area within the sheet for each copy, a case where printing is performed by attaching a different ID for each copy, and a case where printing is performed by changing only the portions of the address and the name for each copy. The button 515 is a button for registering the read image being displayed in the image display area 511 as a reference image. In a case where the button 515 is pressed down, the read image displayed in the image display area 511 is registered along with information on the relevant sheet number (for example, first sheet/ten sheets) and the sheet side (obverse side or reverse side) and further barcode information for identifying the target document. After the registration is completed, the display returns from the registration processing screen 510 to the inspection menu screen 400. The button 516 is a button in a case where the registration of a reference image is cancelled. In a case where the button 516 is pressed down, the registration processing is aborted and the display returns to the inspection menu screen 400. In a case where the display returns to the inspection menu screen 400, the inspection module makes a transition into the normal mode and notifies the printing module 107 that the inspection module 109 is in the normal mode.

Figure 4B:
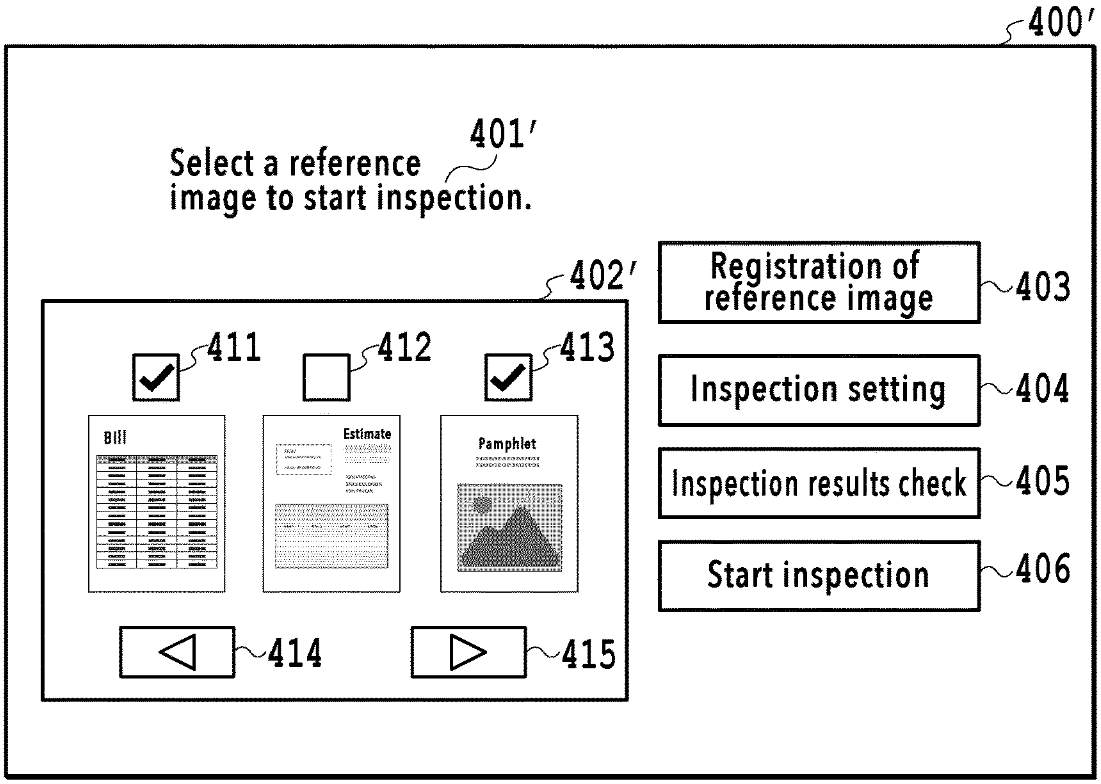

FIG. 4B shows an example of a menu screen 400' that is displayed on the display unit 241 of the inspection module 109 in a case where the reference image corresponding to each of the plurality of inspection jobs is registered. On the menu screen 400', in a message field 401', a message is displayed, which prompts selection of a reference image that is used for inspection processing from among the plurality of registered reference images. Then, in an image display area 402', each representative image of each of the plurality of registered reference images and selection checkboxes 411 to 413 are displayed. Each of the selection boxes 411 to 413 corresponds to each representative image. Spin buttons 414 and 415 on the left side and on the right side are buttons for switching representative images to be displayed in a case where it is not possible to display the representative images for all of the plurality of registered reference images. In a case where the button 406 is pressed down after an arbitrary reference image is selected, print processing accompanied by inspection using the selected reference image is started.

<<Check of Inspection Results>>

Figure 6:
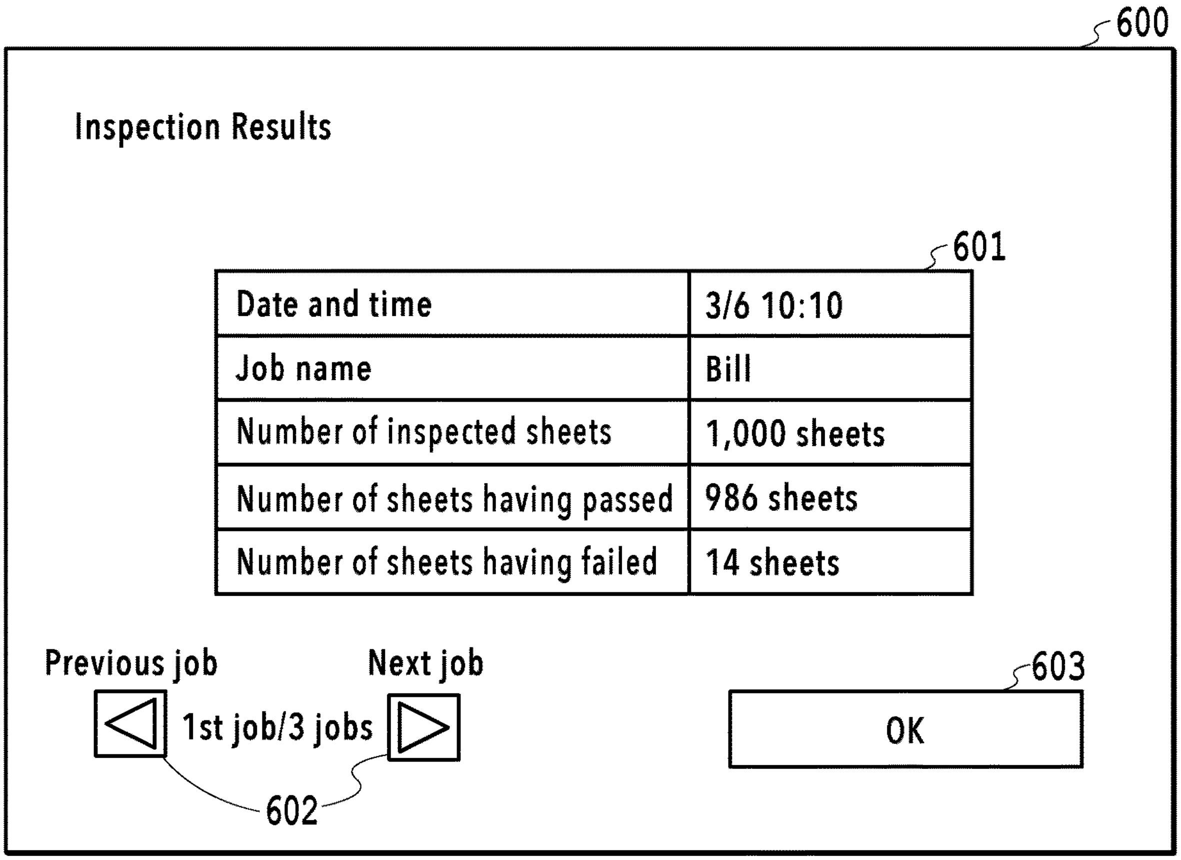
FIG. 6 is a diagram showing an example of a UI screen of the image forming apparatus (inspection module)

In a case where a user presses down the button 405 on the above-described inspection menu screen 400 or 400', a UI screen for checking inspection results (in the following, called "results check screen") as shown in FIG. 6 is displayed on the display unit 241. On a results check screen 600, a results display area 601 in which details of inspection results are displayed, buttons 602 for switching display-target inspection jobs, and an OK button 603 exist. Here, in the results display area 601, each piece of information on the execution date and time of inspection, the name of the target inspection job, the number of sheets for which inspection has been performed, the number of sheets having passed among the number of inspected sheets, and the number of sheets having failed among the number of inspected sheets is displayed for the first job of the nine inspection jobs whose history is stored. Then, it is possible for a user to switch the display-target inspection jobs by operating the left and right spin buttons 602. In a case where a user having checked the inspection results presses down the OK button 603, the display returns to the above-described inspection menu screen 400 or 400'.

<Operation of External Controller>

Following the above, the work that is performed by a user in the external controller 102 in a case where inspection processing is started is explained in detail. Instructions to convey the sample sheet for registering a reference image, the sheet for switching reference images for each printing-target document, and the inspection-target printed sheet to the inspection module 109 are given by the external controller 102.

FIG. 7A is a UI screen for selecting an inspection job to be performed (in the following, called "inspection job selection screen"), which is displayed on the display 212 of the external controller 102. In a setting area 701 on an inspection job selection screen 700, a list of inspection jobs received from the client PC 103 is displayed and a user selects an execution-target inspection job. Here, the state is shown where there jobs to be performed, that is, "Bill", "Estimate", and "Pamphlet" are selected from among the four inspection jobs displayed in the setting area 701. In a case where a user presses down a button 702 after selecting inspection jobs to be performed as described above, the screen makes a transition into a UI screen 710 for detailed setting of inspection jobs (in the following, called "job setting screen") shown in FIG. 7B. A setting area 711 on the job setting screen 710 is an area in which the number of copies is set for each inspection job selected on the above-described inspection job selection screen 700. It is possible to set the number of copies of each selected job being selected in a number of copies setting area 712 within the setting area 711. In this example, 300 copies are set for the inspection job of "Bill", 100 copies are set for the inspection job of "Estimate", and 500 copies are set for the inspection job of "Pamphlet", respectively, A button 713 within the setting area 711 is used in a case where only one copy of each inspection job is printed. For example, it is supposed that a user presses down the button 713 corresponding to "Bill" after giving instructions to start registration of a reference image to the inspection module 109. In this case, first, to the printing module 107, a print job to give instructions to print one copy of "Bill" is issued. The printing module 107 having received the print job performs print processing and outputs one copy of "Bill" only and the printed sheet (the top page thereof is job switching sheet) is conveyed to the inspection module 109. Then, in the inspection module 109, the printed sheet that is conveyed is read and the registration of the reference image corresponding to "Bill" is performed. In a setting area 714, the sheet discharge destination of the inspection job being selected is set. Here, as the sheet discharge destination in a case where the inspection has been passed, the large-capacity stacker 110 is set and as the sheet discharge destination in a case where the inspection has been failed, the escape tray 346 is set. A button 715 is used in a case where the sample sheet at the time of registration of a reference image is fed from the inserter 108. Due to this, it is possible to register the reference image by using the sample sheet determined to be normally printed by a user's visual inspection. At the time of using the button 715, a user sets the printed sheet for which it has been checked in advance that there is no printing defect and the job switching sheet on the tray 321 of the inserter 108. Due to this, the sample sheet is conveyed from the inserter 108 to the inspection module 109 and in the inspection module 109, the conveyed sample sheet is read and registration of the reference image is performed. A button 716 is a button for giving instructions to start printing of the inspection job. By pressing down of the button 716, the external controller 102 generates an inspection job based on the setting values in the above-described setting areas 711 and 714 and inputs the inspection job to the printing module 107. In the present embodiment, in the inspection module 109, first, instructions to start inspection are given (button 406 on the inspection menu screen 400 is pressed down) and following that, instructions to start printing of the inspection job are given (button 716 on the job setting screen 710 is pressed down). Based on the instructions to start printing, the external controller 102 inputs the print data to the printing module 107 and gives instructions to convey the printed sheet to the inspection module 109. Then, the printed sheet is conveyed to the inspection module 109 and the inspection processing is performed.

<<Job Input Processing>>

Figure 8:
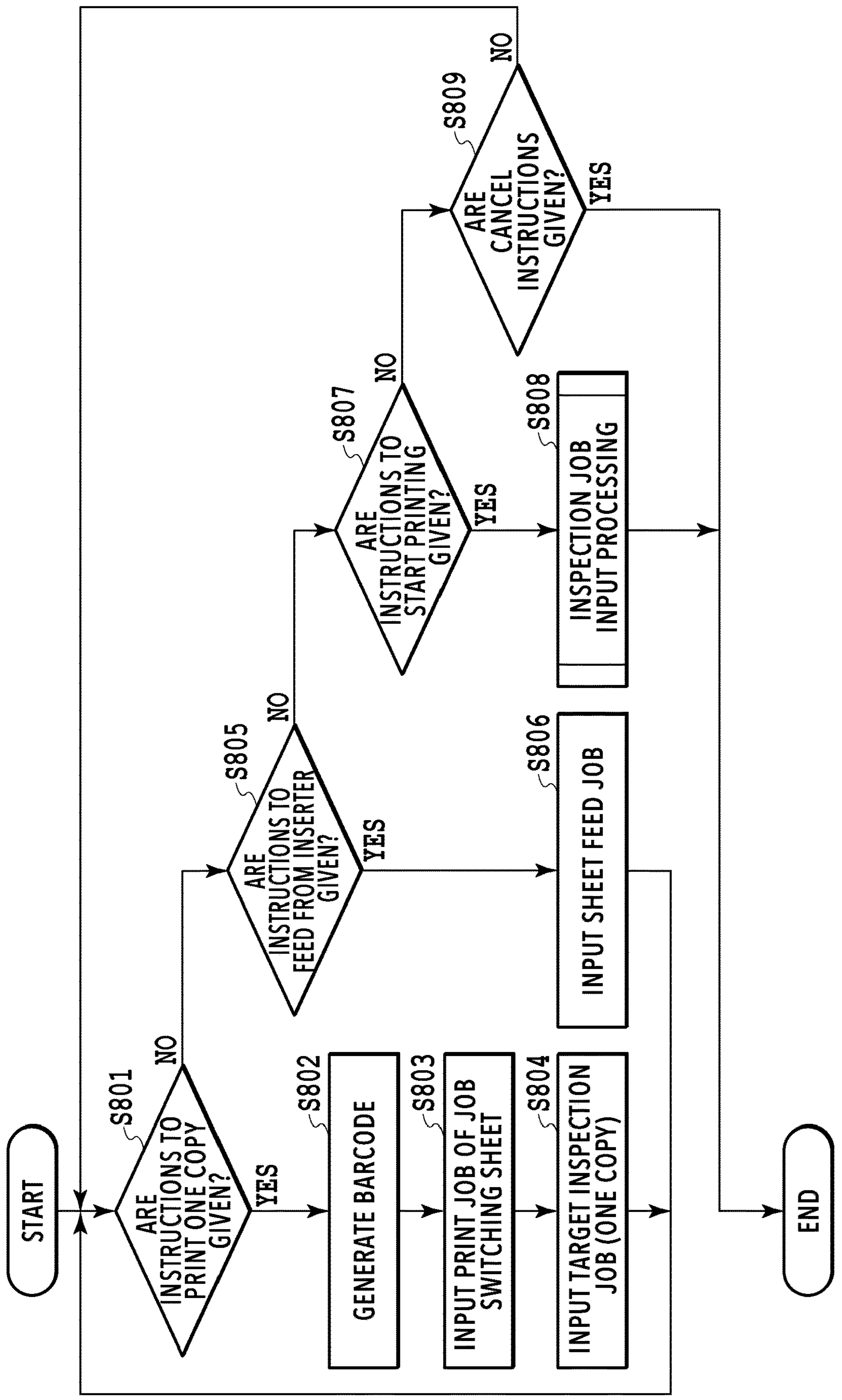
FIG. 8 is a flowchart showing a flow of job input processing performed by the external controller.

FIG. 8 is a flowchart showing a flow of job input processing that is performed by the external controller 102. The series of processing shown in the flowchart in FIG. 8 is implemented by the CPU 208 of the external controller 102 executing a predetermined program. In a case where some user instructions are input via the job setting screen 710 in FIG. 7B described previously, the following processing is started.

At S801, whether or not the input user instructions are instructions to print one copy is determined. In a case where a user has pressed down the button 713 to give instructions to print one copy on the job setting screen 710, the processing advances to S802 in other cases, the processing advances to S805.

Figure 9B:
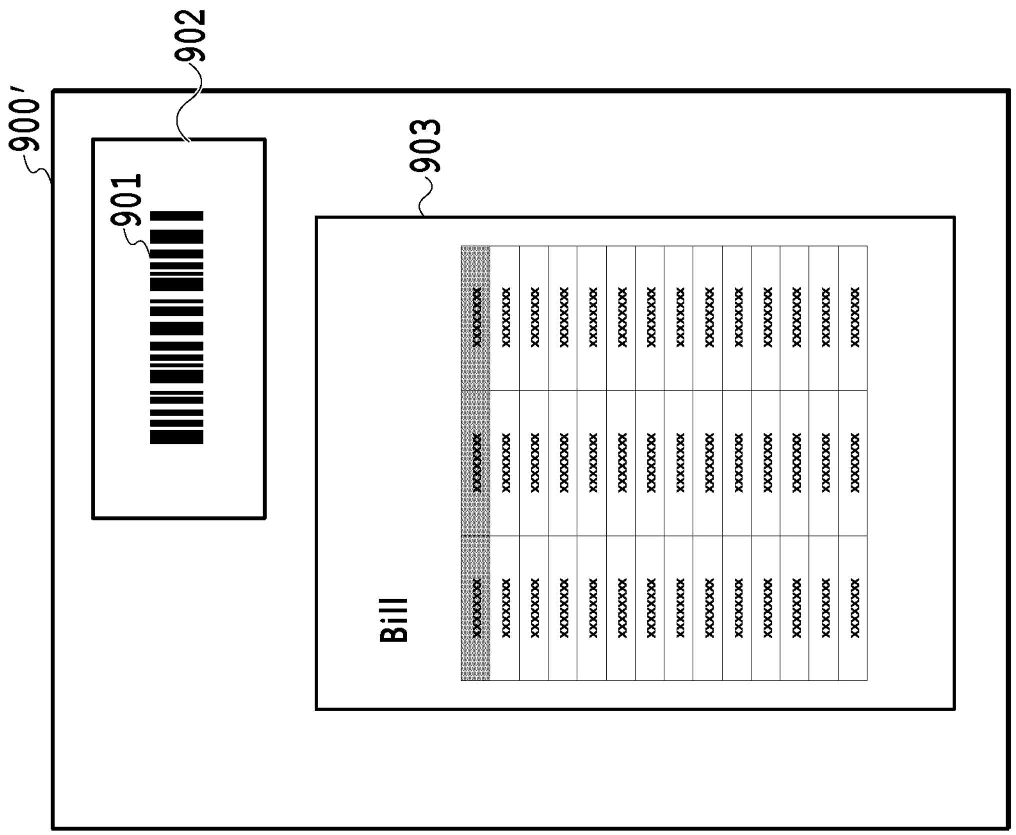
FIG. 9A and FIG. 9B are each a diagram showing an example of a job switching sheet.
Figure 9A:
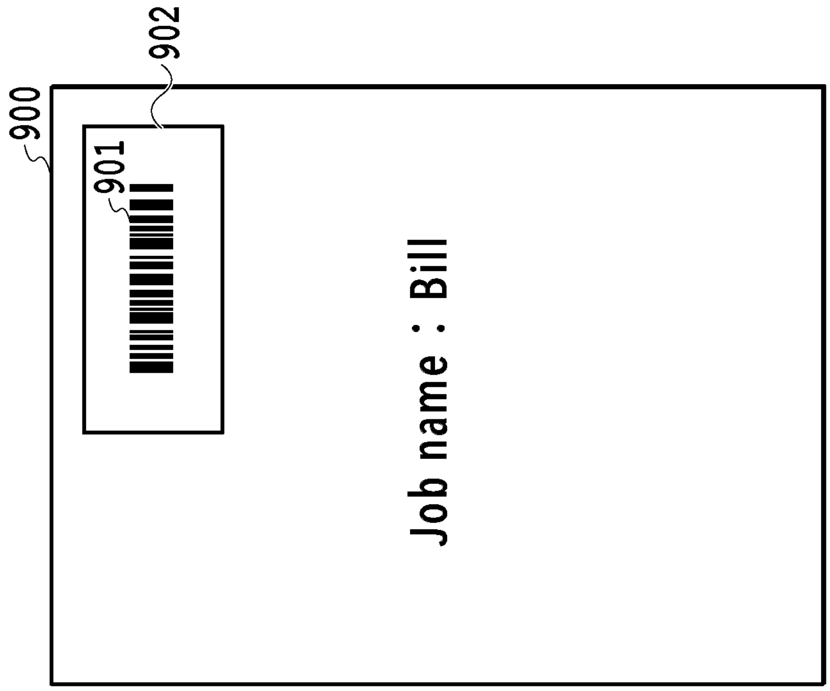

At S802, a barcode capable of uniquely identifying the target document (inspection job) whose one copy is printed is generated. Information on the generated barcode is stored in the memory 209 along with the image data of the document relating to the inspection job to which instructions to print one copy are given. At next S803, based on the barcode generated/stored at S802, the printing module 107 is instructed to print the job switching sheet. FIG. 9A shows an example of the job switching sheet. As shown in FIG. 9A, on a sheet switching sheet 900, a barcode 901 is printed. A rectangular frame 902 surrounding the barcode 901 is an area (barcode area) in which the presence/absence of a barcode is checked at the time of inspection processing. Then, at S804, the job to give instructions to print one copy of the target document is input to the printing module 107.

At S805, whether or not the input user instructions are instructions to feed the sample sheet from the inserter 108 is determined. In a case where a user has pressed down the button 715 to give instructions to feed the sample sheet from the inserter 108, the processing advances to S806 and in other cases, the processing advance to S807.

At S806, the job (sheet feed job) to give instructions to feed the sample sheet that is set to the inserter 108 is input to the printing module 107. At this time, it is necessary for a user to set in advance one copy of the sample sheet, including the job switching sheet, to the inserter 108.

At S807, whether or not the input user instructions are instructions to start printing accompanied by inspection processing is determined. In a case where a user has pressed down the button 716 to give instructions to start printing, the processing advances to S808 and in other cases, the processing advances to S809.

At S808, the one inspection job or a plurality of the inspection jobs relating to the user selection, which is displayed in the setting area 711 on the job setting screen 710, is input to the printing module 107 sequentially. Details of the inspection job input processing will be described later.

At S809, whether or not the input user instructions are instructions to cancel the processing is determined. In a case where a user has pressed down a button 717 to give instructions to abort the processing, this processing is terminated. On the other hand, in a case where the input user instructions are not instructions to cancel the processing, the processing returns to S801.

The above is the flow of the job input processing that is performed by the external controller 102.

<<Details of Inspection Job Input Processing>>

Figure 10:
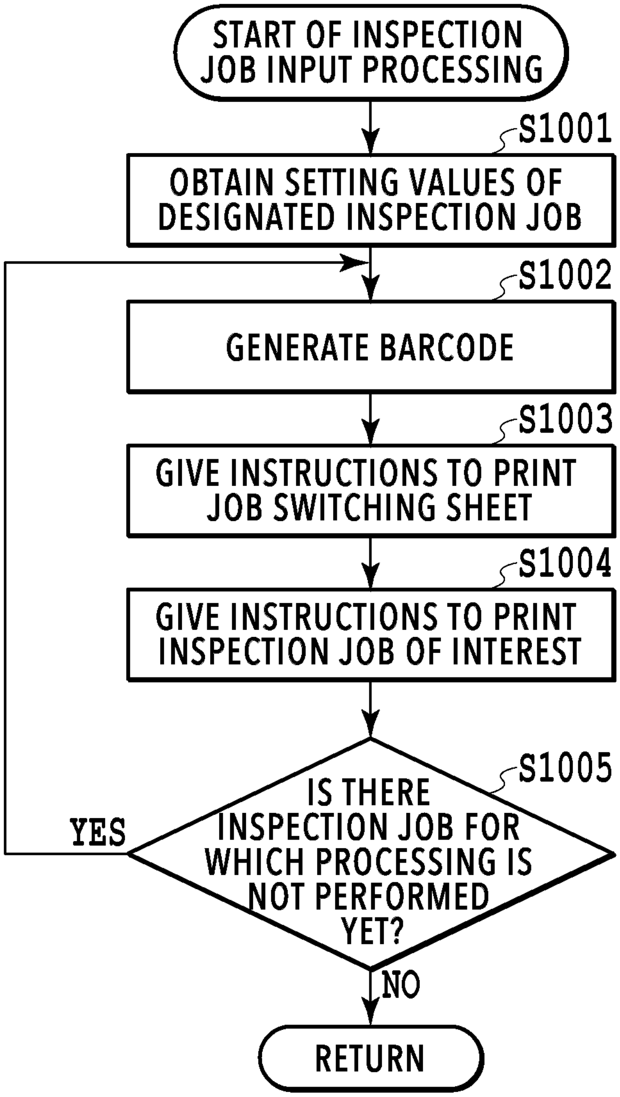
FIG. 10 is a flowchart showing details of inspection job input processing.

Following the above, details of processing to input the inspection job to the printing module 107 (S808) are explained with reference to the flowchart shown in FIG. 10.

At S1001, the setting values relating to each inspection job displayed in the list in the setting area 711 on the job setting screen 710, specifically, the setting values of the number of copies and the sheet discharge destination are obtained for each inspection job.

At S1002, a barcode capable of uniquely identifying the inspection job of interest among the inspection jobs displayed in the list is generated. It is sufficient to determine the inspection job of interest in order from, for example, the inspection job located at the uppermost position in the list. Information on the generated barcode is stored in the memory 209 along with the image data of the document relating to the inspection job of interest.

At S1003, based on the barcode generated/stored at S1002, the printing module 107 is instructed to print the job switching sheet for switching the reference images for each inspection job (for each document).

At S1004, the printing module 107 is instructed to print the inspection job of interest. At this time, based on the setting values obtained at S1001, the number of copies and the sheet discharge destination in a case where the inspection has been passed and the sheet discharge destination in a case where the inspection has been failed are also designated.

In a case where the print processing for the designated number of copies relating to the inspection job of interest is completed, at S1005, whether or not there remains an unprocessed inspection job is determined. In a case where an unprocessed inspection job remains, the processing returns to S1002, and the next inspection job of interest is determined and the same processing is repeated. On the other hand, in a case where the processing is completed for all the inspection jobs selected by a user, this processing is terminated.

The above is the details of the processing to input the inspection job.

<Operation of Inspection Module>

Figure 11:
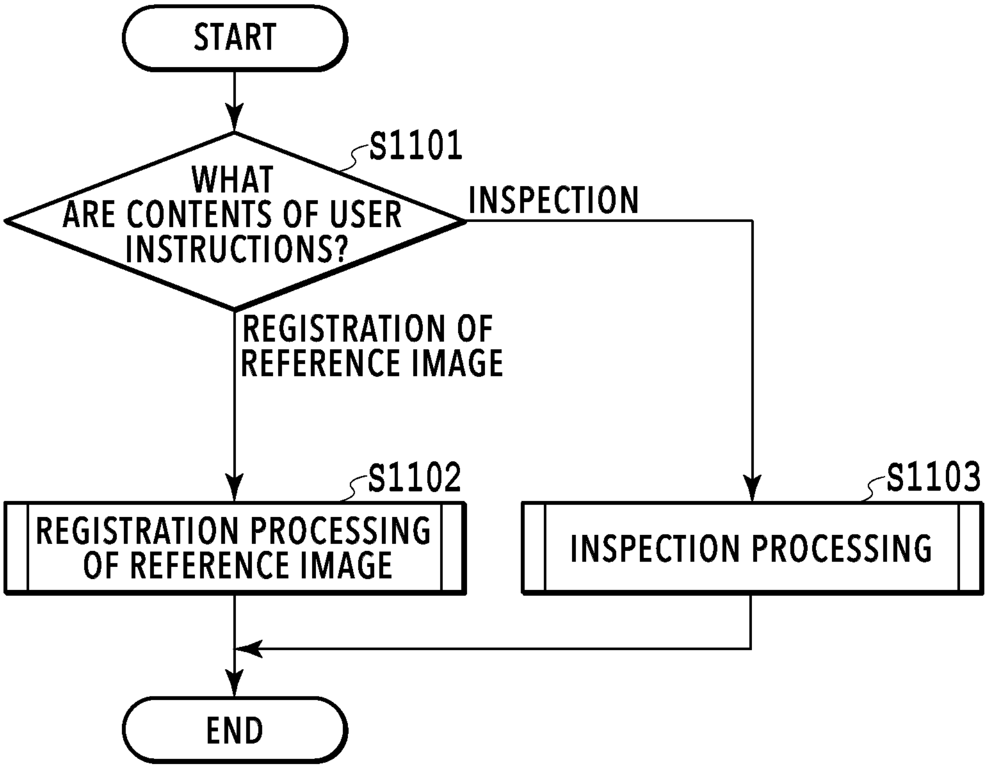
FIG. 11 is a flowchart showing operation control of the inspection module.

Next, the operation on the side of the inspection module 109 is explained in detail with reference to the flowchart in FIG. 11. The series of processing shown in the flowchart in FIG. 11 is implemented by the CPU 238 of the inspection module 109 executing a predetermined program. In a case where instructions to start inspection processing are input via the inspection menu screen 400 in FIG. 4A described previously, or instructions to register a reference image are input via the image registration screen 500 in FIG. 5A, the following processing is started.

At S1101, whether the input user instructions are instructions to register a reference image or instructions to start inspection processing is determined. In a case of the instructions to register a reference image, the processing advances to S1102 and in a case of the instructions to start inspection processing, the processing advances to S1103.

At S1102, the operation mode is set to the reference image registration mode and registration processing of a reference image is performed. Details of the reference image registration processing will be described later.

At S1103, the operation mode is set to the inspection mode and inspection processing is performed. Details of the inspection processing will be described later.

The above is the rough flow of the operation on the side of the inspection module 109.

<<Reference Image Registration Processing>>

Following the above, details of the reference image registration processing (S1102) are explained with reference to the flowchart shown in FIG. 12.

At S1201, the setting values for registering a reference image are obtained. The setting values obtained here include information on the number of sheets per copy, the side on which inspection is performed, whether or not blank sheet registration is performed (presence/absence of check), which are set on the image registration screen 500 in FIG. 5A, and the like. In a case where blank sheet registration is performed, it is sufficient to feed a blank sheet from the inserter 108, or input the job to print only one blank sheet.

Processing at S1202 is processing to detect a sheet that is conveyed from the printing module 107 or the inserter 108. In a case where a sheet is detected, the processing advances to S1203.

At S1203, both sides of the detected sheet are captured by the camera 231 and the camera 232 and the images on the sheet are read. The read image thus obtained is stored in the memory 239 and at the same time, displayed in the image display area 511 on the registration processing screen 510. The first sheet among the sheets that are conveyed is the job switching sheet for switching reference images for each job.

At S1204, based on the information on the number of sheets per copy, which is obtained at S1201, whether or not the designated number of sheets is read is determined. In a case where reading of the designated number of sheets is completed, the processing advances to S1205 and in a case where the number of read sheets does not reach the designated number of sheets, the processing returns to S1202 and the processing is continued.

At S1205, whether or not user instructions to register the read image obtained at S1203 as the reference image are input is determined. In a case where registration instructions by pressing down the button 515 on the image registration screen 510 in FIG. 5B are input, the processing advances to S1206 and in a case where cancel instructions by pressing down the button 516 are input, this processing is exited.

At S1206, whether or not the read image relating to the registration instructions is a blank sheet image and the setting to perform the blank sheet registration is set is determined. In this case, the read image on the top page among the read images obtained at S1203 is the read image of the job switching sheet. Consequently, the "read image relating to the registration instructions" is the read image on the subsequent pages except for the top page. In a case where the read image relating to the registration instructions is a blank sheet image and the setting to perform the blank sheet registration is set, the processing advances to S1208. On the other hand, in a case where the read image relating to the registration instructions is not a blank sheet image or in a case where the setting not to perform the blank sheet registration is set, the processing advances to S1207.

At S1207, processing to register the read image obtained at S1203 as the reference image for each page is performed. Specifically, processing to obtain the barcode image by trimming the barcode area in the read image of the job switching sheet stored in the memory 239 and associate each read image on the subsequent pages and the barcode image with each other and store them in the memory 239 is performed. Here, it is assumed that the target document (inspection job) of the reference image registration processing consists of a total of five pages and the third page is a blank sheet page. Then, it is assumed that instructions to perform registration of the reference image accompanied by print processing are given in the state where the blank sheet saving function (function to prevent the page from being output in a case where the output-target page is a blank sheet) is set to OFF on the side of the printing module 107. In this case, in sheet reading processing at S1203, the read images corresponding to the total of five pages (except for the job switching sheet) are obtained. Then, in the read images corresponding to the five pages, the blank sheet image obtained by reading the blank sheet page is also included, and therefore, with the blank sheet image also, the barcode image is associated and the blank sheet image is registered as the reference image. On the other hand, it is assumed that instructions to perform registration of the reference image accompanied by print processing are given in the state where the blank sheet saving function is set to ON on the side of the printing module 107 for the same document of the total of five pages (document whose third page is the blank sheet page). In this case, in the sheet reading processing at S1203, except for the page corresponding to the job switching sheet, the read images corresponding to the four pages, which corresponds to each page of 1, 2, 4, and 5, are obtained. That is, in the read images corresponding to the four pages, the image of the third page, which is the blank sheet page, is not included and with the obtained read images corresponding to the four pages, the barcode image is associated and the read images are registered as the reference images.

At S1208, the blank sheet image obtained by reading the blank sheet at S1203 is registered as the reference image. Specifically, in the blank sheet image storage area of the memory 239, the data of one blank sheet image is associated with the designated sheet size/sheet type and stored as the reference image. At this time, the association with the barcode is not necessary, and therefore, the read image of the job switching sheet stored in the memory 239 is discarded without being used. The registration of the blank sheet image such as this is performed based on printing of one copy of the blank sheet page, or feeding of one blank sheet from the inserter 108. By registering only the blank sheet image as the reference image, it is made possible to suppress the occurrence of inconsistency between collated pages even in a case where the setting value of the function (in the present embodiment, the blank sheet saving function), which may cause a change in output of the blank sheet page in the printing module 107, is different between at the time of registration of the reference image and at the time of inspection of the reference image.

The above is the flow of the processing at the time of registering the reference image.

<<Inspection Processing>>

Figure 13:
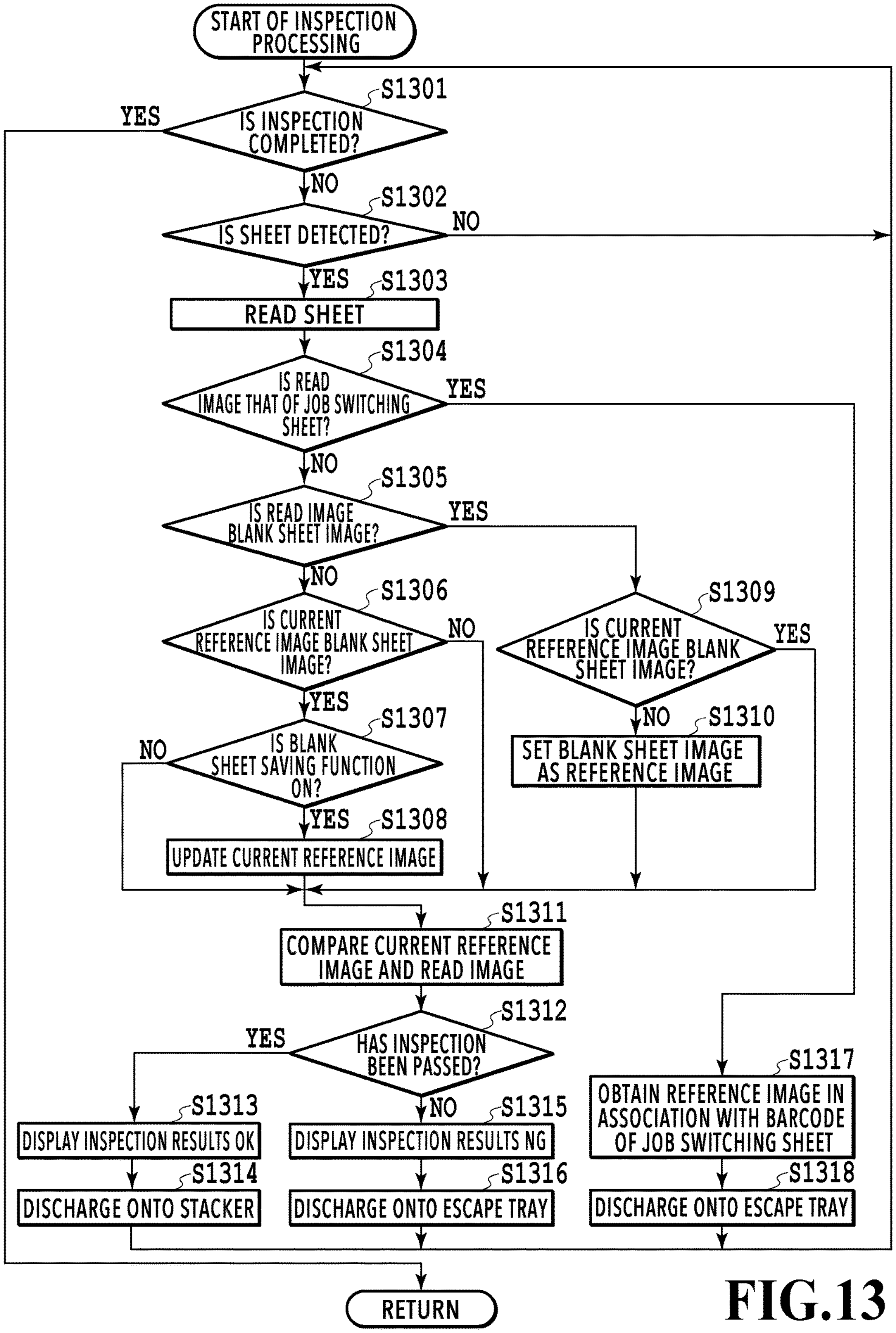
FIG. 13 is a flowchart showing details of inspection processing.

Following the above, details of the inspection processing (S1103) are explained with reference to the flowchart shown in FIG. 13. It is assumed that information on the setting value indicating whether the setting to use the blank sheet saving function is set in the printing module 107 is obtained in advance and stored in the memory 239 before the flow shown in FIG. 13 is started.

Figure 14A:
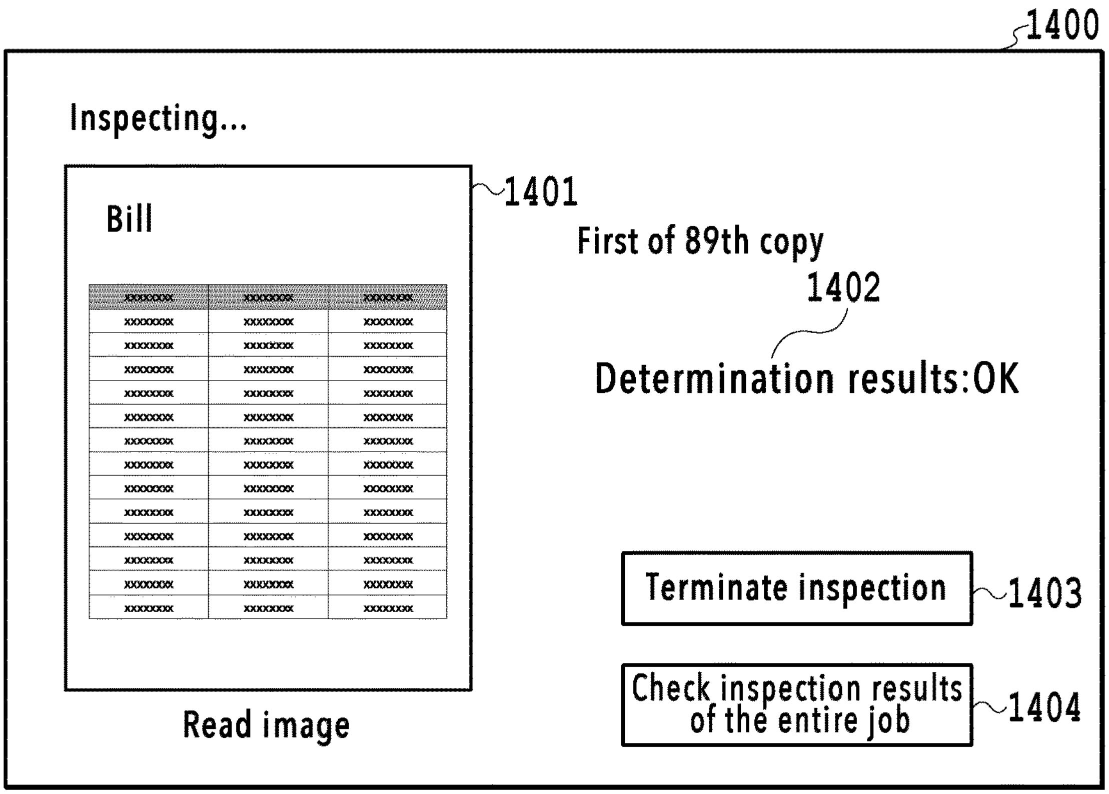
FIG. 14A and FIG. 14B are each a diagram showing an example of an inspection results screen.
Figure 14B:
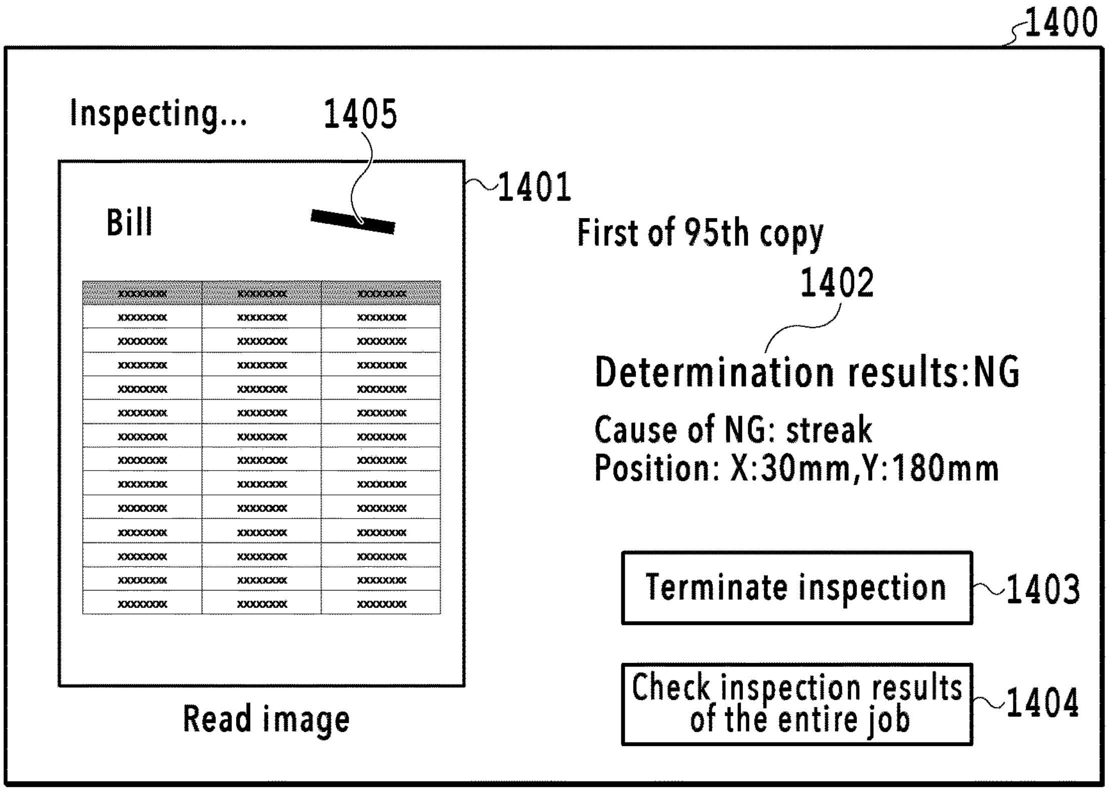

At S1301, whether or not the inspection processing is completed is determined. In a case where the inspection processing of all the copies designated in the input inspection job is completed or in a case where a "Terminate inspection" button 1403 on an inspection results screen 1400 shown in FIG. 14A and FIG. 14B is pressed down, it is determined that the inspection processing is completed and this processing is terminated. On the other hand, it is determined that the timing is not that at which the inspection processing is terminated, the processing advances to 1302.

Processing at S1302 is processing to detect a sheet that is conveyed from the printing module 107 or the inserter 108. In a case where a sheet is detected, the processing advances to S1303 and in a case where no sheet is detected, the processing returns to S1301.

At S1303, both sides of the detected sheet are captured by the camera 231 and the camera 232 and the images on the sheet are read. The data of the read images thus obtained is stored in the memory 239 and at the same time, displayed in an image display area 1401 on the inspection results screen 1400 in FIG. 14A and FIG. 14B.

At S1304, whether or not the read image obtained at S1303 is the read image of the job switching sheet is determined. This determination is performed by comparing the image area corresponding to the barcode area described previously in the target read image and the barcode image (see S1207 described previously) stored in the memory 239. In a case where comparison results indicate that the image in the barcode area in the read image matches with the stored barcode image, the processing advances to S1317. At S1307, one reference image or a plurality of reference images associated with the barcode image stored in the memory is obtained and the reference image on the top page is set as the reference image that is referred to at first in the comparison with the read image. Then, at S1308 that follows, the printing module 107 is instructed to discharge the sheet whose image has been read onto the escape tray of the large-capacity stacker 110. After that, the processing returns to S1301 and the same processing is repeated. On the other hand, in a case where the image in the barcode area in the read image does not match with the stored barcode image, the processing advances to S1305. That is, in a case where the read image obtained at S1303 is the first sheet that is conveyed from the printing module 107, the processing advances to S1317 and in a case where the read image obtained at S1303 is the second or subsequent sheet, the processing advances to S1306.

At S1305, whether or not the read image obtained at S1303 is the blank sheet image is determined. In order to determine whether the read image is the blank sheet image, it is sufficient to perform, for example, processing to check whether the values (RGB values) of each pixel constituting the read image are pixel values representing white, for example, in a case of 8-bit signal values, perform check processing to determine white on a condition that each value of RGB exceeds 250. Further, it may also be possible to branch the processing by obtaining information on whether the read image is the blank sheet page obtained at the time of rasterizing in the printing module 107 and based on the results. In a case where the read image is determined to be not the blank sheet image, the processing advances to S1306 and in a case where the read image is determined to be the blank sheet image, the processing advances to S1309. The situation in which the read image is the blank sheet image is normally limited to the case where the blank sheet saving function is set to OFF. That is, in a case where the blank sheet saving function is set to ON in the printing module 107, unless some abnormality occurs in the process of the print processing, all the read images are non-blank sheet images, and therefore, the processing advances to S1306.

At S1306, whether or not the currently set reference image is the blank sheet image is determined. In a case where the currently set reference image is the blank sheet image, the processing advanced to S1307 and in a case where the currently set reference image is not the blank sheet image, the processing advances to S1311.

At S1307, whether the blank sheet saving function is set to ON in the printing module 107 is checked. As described above, in the stage where the processing advances to this step, it is estimated that the blank sheet saving function is set to ON, but here, this is checked just in case. The information on the setting state of the blank sheet saving function in the printing module 107 is obtained/stored in advance, and therefore, in a case where the blank sheet saving function is set to ON in the printing module 107, the processing advances to S1308 and in a case where the blank sheet saving function is set to OFF, the processing advances to S1311. In a case where it is determined that the blank sheet saving function is set to OFF, it may also be possible to perform error processing without the processing advancing to S1311.

At S1308, the reference image that is collated with the read image is updated. Due to this, for example, in a case where the currently set reference image is the reference image corresponding to the first page, the reference image corresponding to the second page becomes the currently set reference image anew.

At S1309 in a case where the read image is the blank sheet image, as at S1306, whether or not the currently set reference image among the registered reference images is the blank sheet image is determined. In a case where the currently set reference image is the blank sheet image, the processing advances to S1311 and in a case where the currently set reference image is not the blank sheet image, the processing advances to S1310.

Figure 12:
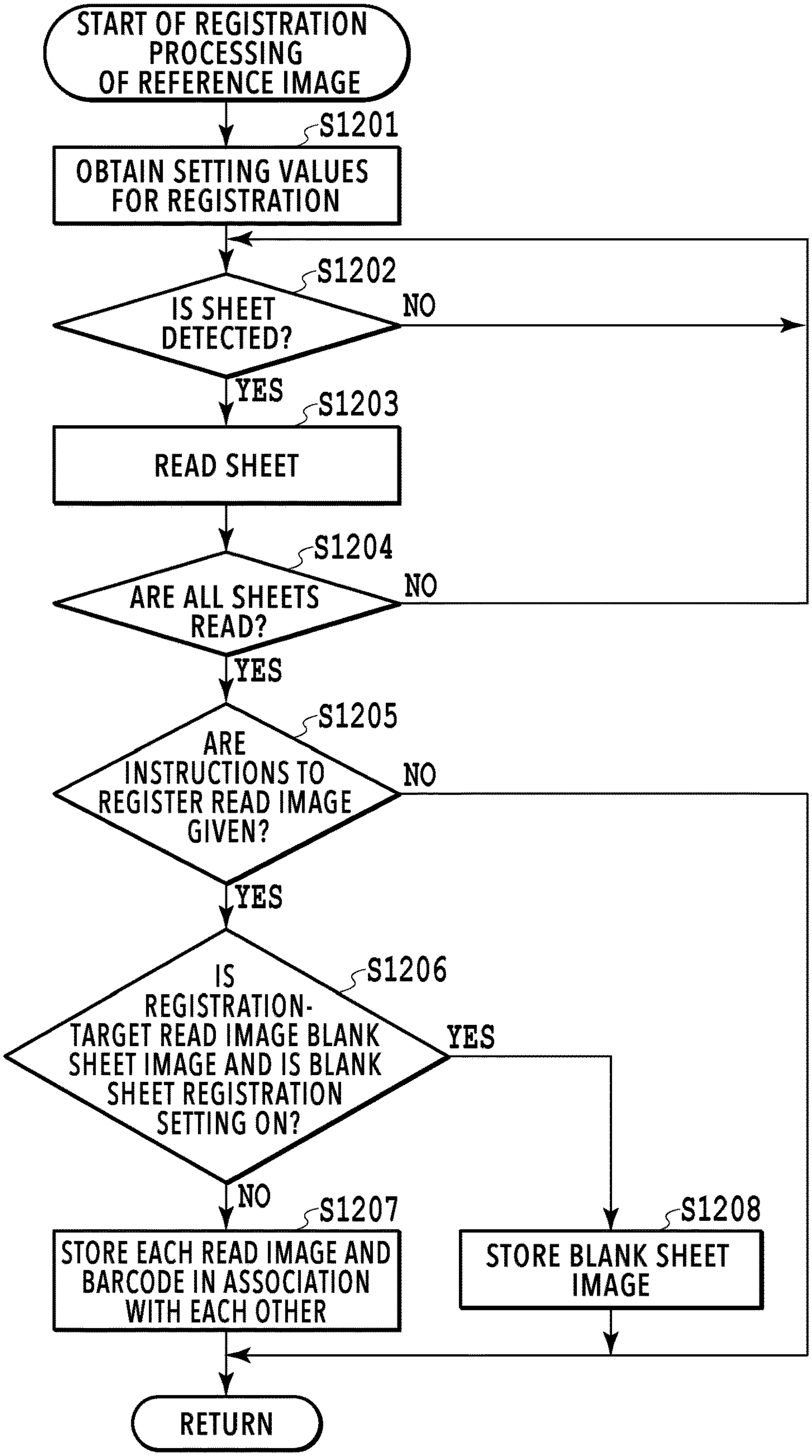
FIG. 12 is a flowchart showing details of registration processing of a reference image.

At S1310, the blank sheet image registered as the reference image in the flow in FIG. 12 described previously (see S1208) is set as the reference image that is collated with the read image. Due to this, the blank sheet image becomes the currently set reference image.

At S1311, the read image obtained at S1303 and the currently set reference image are collated with each other and the presence/absence of a printing defect is analyzed. In a case where no predetermined defect is detected in the read image, it is determined that the read image has passed the inspection and in a case where a defect is detected, it is determined that the read image has failed the inspection.

At S1312, the processing is branched in accordance with the determination results at S1311. In a case where the determination results at S1311 indicates that the read image has passed the inspection, the processing advances to S1313 and in a case where the read image has failed the inspection, the processing advances to S1315.

At S1313, a notification to the effect that no printing defect is detected in the inspection is displayed. For example, as in a results display area 1402 on the inspection results screen 1400 in FIG. 14A, characters of "OK" are displayed. At S1314 that follows, the printing module 107 is instructed to discharge the sheet from which the image has been read to a predetermined sheet discharge destination (for example, the large-capacity stacker 110). The sheet discharge destination here is the sheet discharge destination that is set in the setting area 714 on the job setting screen 710 in FIG. 7B described previously. After this, the processing returns to S1301 and the processing is repeated.

At S1305, a notification to the effect that a printing defect is detected in the inspection is displayed. For example, as in the results display area 1402 on the inspection results screen 1400 in FIG. 14B, characters of "NG" are displayed. At S1316 that follows, the printing module 107 is instructed to discharge the sheet from which the image has been read to a predetermined sheet discharge destination (for example, the escape tray 346). The sheet discharge destination here is also the sheet discharge destination that is set in the setting area 714 on the job setting screen 710 in FIG. 7B described previously. After this, the processing returns to S1301 and the processing is repeated.

The above is the flow of the inspection processing. Here, the flow of the actual operation at the time of the inspection processing is explained for each case. As the premise, it is assumed that the inspection job that is input consists of a total of five pages, the third page is the blank sheet page, and the blank sheet page not in association with a specific job is already registered as the reference image.

<Case 1: Blank Sheet Saving Function is OFF Both at the Time of Registration of Reference Image and at the Time of Execution of Inspection Printing>

In this case, the read images of the total of five pages including the blank sheet page (in a case where the page for switching is included, a total of six pages. This applies to the following) are registered in advance as the reference images and at the time of printing accompanied by inspection, the total of five pages including the blank sheet page are subjected to print processing and output.

Each of the read images of the non-blank sheet pages (first, second, fourth, and fifth pages) is compared with the corresponding reference image. Consequently, for each page, No at S1305 and No at S1306, and therefore, the processing advances to S1311 and the read image of each page and the reference image of the corresponding page are compared.

The processing of the read image of the third page, which is the blank sheet page, is as follows.

1) The read image is the blank sheet image, and therefore, Yes at S1305 and the processing advances to S1309.
2) As the reference image of the third page, the blank sheet image is registered, and therefore, Yes at S1309 and the processing advances to S1311.
3) The read image of the blank sheet of the third page and the blank sheet image as the reference image are compared (S1311).

<Case 2: Blank Sheet Saving Function is ON Both at the Time of Registration of Reference Image and at the Time of Execution of Inspection Printing>

In this case, the read images of a total of four pages excluding the blank sheet page (first, second, fourth and fifth pages) are registered as the reference images and the total of four pages (first, second, fourth, and fifth pages) excluding the blank sheet page are subjected to print processing and output also at the time of printing accompanied by inspection.

Each of the read images of the non-blank sheet pages (first, second, fourth, and fifth pages) is compared with the reference image of the corresponding page. That is, for all the pages, No at S1305 and No at S1306, and therefore, the processing advances to S1311 and the read image of each page and the reference image of the corresponding page are compared.

<Case 3: Blank Sheet Saving Function is ON at the Time of Registration of Reference Image and Blank Sheet Saving Function is OFF at the Time of Execution of Inspection Printing>

In this case, the read images of a total of four pages excluding the blank sheet page (first, second, fourth and fifth pages) are registered as the reference images and at the time of printing accompanied by inspection, a total of five pages including the blank sheet page are subjected to print processing and output.

Each of the read images of the non-blank sheet pages (first, second, fourth, and fifth pages) is compared with the corresponding reference image. That is, for each page, No at S1305 and No at S1306, and therefore, the processing advances to S1311 and the read image of each page and the reference image of the corresponding page are compared.

The processing of the third page, which is the blank sheet page, is as follows.

1) The read image is the blank sheet image, and therefore, Yes at S1305 and the processing advances to S1309.
2) The reference image that is being set is not the blank sheet image (at this point in time, the reference image of the fourth page), and therefore, No at S1309 and the processing advances to S1310.
3) The blank sheet image that is registered in advance as the reference image common to the jobs is read and set as the reference image and the processing advanced to S1311.
4) The read image of the blank sheet page and the blank sheet image as the reference image are compared (S1311)

<Case 4: Blank Sheet Saving Function is OFF at the Time of Registration of Reference Image and Blank Sheet Saving Function is ON at the Time of Execution of Inspection Printing>

In this case, the read images of a total of five pages including the blank sheet page are registered as the reference images and at the time of printing accompanied by inspection, a total of four pages (first, second, fourth, and fifth pages) excluding the blank sheet page are subjected to print processing and output.

Each of the read images of the first and second pages, which are the non-blank sheet pages, is compared with the corresponding reference image. That is, for each page, No at S1305 and No at S1306, and therefore, the processing advances to S1311 and the read image of each page and the reference image of the corresponding page are compared.

The processing of the third sheet (fourth page), which is the non-blank sheet page, is as follows.

1) The read image is not the blank sheet image, and therefore, No at S1305 and the processing advances to S1306.
2) The currently set reference image is the blank sheet image (the read image of the blank sheet page of the third page included in the job is registered as the reference image), and therefore, Yes at S1306 and the processing advances to S1307.
3) The blank sheet saving function of the printing module 107 is ON, and therefore, Yes at S1307 and the processing advances to S1308.
4) The reference image is updated (the reference image of the fourth page is read and set) and the processing advances to S1311.
5) The read image and the reference image of the fourth page are compared (S1311).

The read image of the fourth sheet (fifth page), which is the non-blank sheet page, is compared with the corresponding reference image. That is, No at S1305 and No at S1306, and therefore, the processing advances to S1311 and the read image of the fifth page and the reference image of the corresponding page are compared.

As above, according to the method of the present embodiment, it can be seen that the inspection processing is performed without the occurrence of mismatch in collated pages between the read image and the reference image in each case.

<Operation of Printing Module>

Figure 15A:
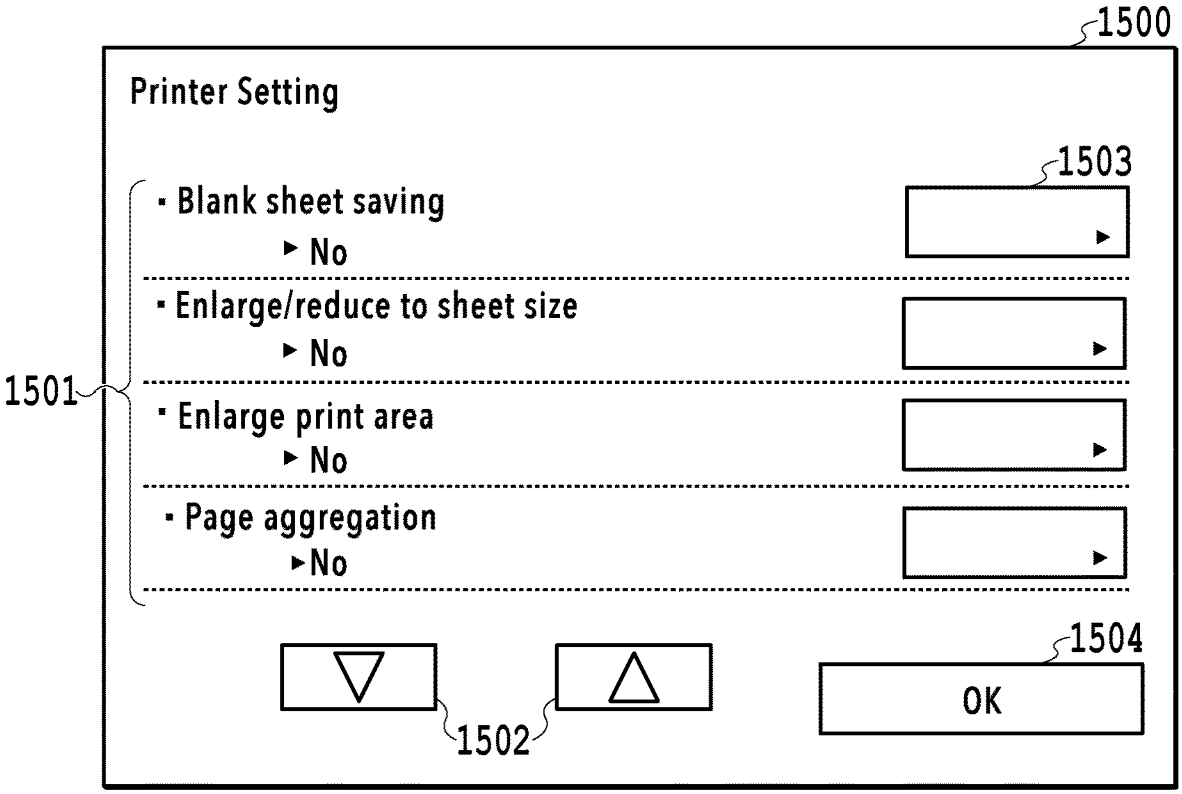
FIG. 15A and FIG. 15B are each a diagram showing an example of a printer setting screen.
Figure 15B:
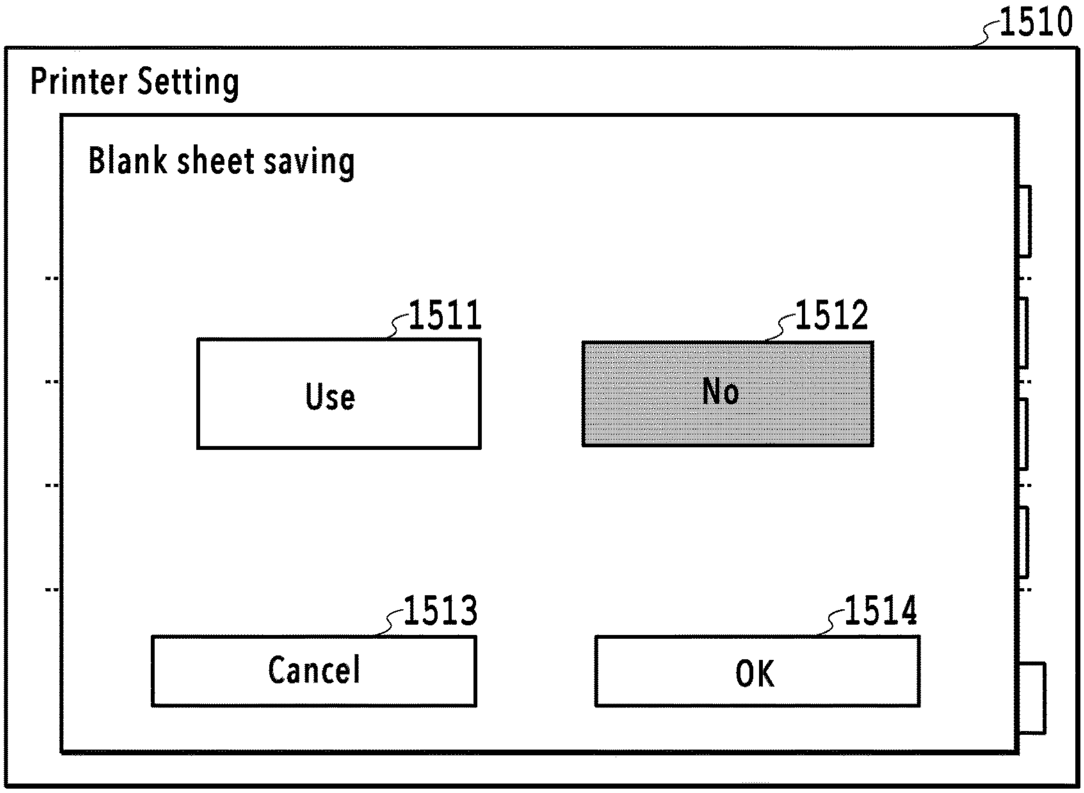

Following the above, the work that is performed by a user for the printing module 107 at the time of starting the print processing accompanied by inspection is explained. FIG. 15A is an example of a UI screen for performing setting of printing conditions (in the following, called "printer setting screen"), which is displayed on the display 225 of the printing module 107. A Printer Setting screen 1500 is displayed and controlled by the CPU 222 of the printing module 107. In an item display area 1501, each setting item is displayed in a list and it is possible to scroll setting items by buttons 1502. Each setting item is displayed by pressing down the button located to the right. A button 1503 is a button for displaying a sub screen for setting "Blank sheet saving". In a case where the button 1503 is pressed down, a sub screen 1510 for setting the blank sheet saving function to ON or OFF shown in FIG. 15B is displayed in a pop-up manner. In a case of using the blank sheet saving function, a user selects a button 1511 and subsequently presses down a button 1514. Further, in a case of not using the blank sheet saving function, a user selects a button 1512 and subsequently presses down the button 1514. In a case where a user presses down a button 1513, the operation is cancelled and the sub screen 1510 exits with the original setting values unchanged. In a case where the button 1514 is pressed down, the content of the setting selected immediately before are stored and the sub screen 1510 exits. Then, in a case where a button 1504 on the Printer Setting screen 1500 is pressed down, the contents of the setting selected immediately before for each setting item are stored and the screen display terminates.

Figure 16:
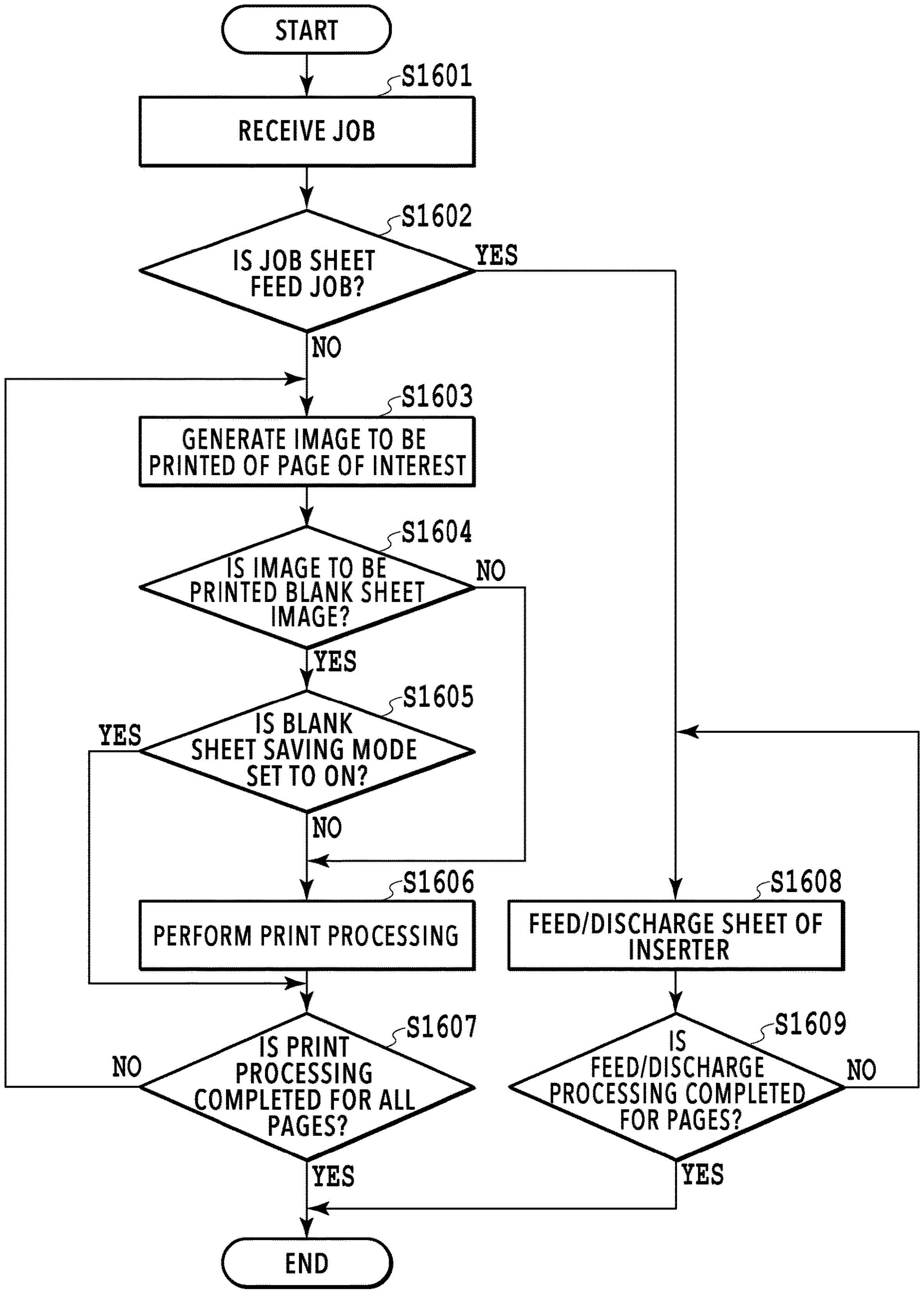
FIG. 16 is a flowchart showing operation control of a printing module.

Next, the operation in the printing module 107 is explained in detail with reference to the flowchart in FIG. 16. The series of processing shown in the flowchart in FIG. 16 is implemented by the CPU 222 of the printing module 107 executing a predetermined program.

At S1601, the job that is input from the external controller 102 is received. At next S1602, whether or not the received job is the sheet feed job to give instructions to take in the sheet from the inserter 108 is determined. In a case where the job is the sheet feed job, the processing advances to S1608 and in a case where the job is not the sheet feed job (that is, the job is the print job), the processing advances to S1603.

At S1603, based on the print job received at S1601, an image to be printed for each page is generated. At S1604 that follows, whether or not the image to be printed that is generated at S1603 is a blank sheet image is determined. The determination method at this time is the same as that explained at S1305 described previously. In a case where results of the determination indicate that the image to be printed is a blank sheet image, the processing advances to S1605 and in a case where the image to be printed is not a blank sheet image, the processing advances to S1606.

At S1605, whether or not the blank sheet saving function is set to ON is determined. In a case where the blank sheet saving function is set to ON, the processing advances to S1607 and in a case where the blank sheet saving function is set to OFF, the processing advances to S1606.

At S1606, the print processing of the image to be printed that is generated at S1603 is performed. Then, at S1607, whether or not the print processing of all the pages designated in the print job is completed is determined. In a case where there is a page for which the print processing is not completed yet, the processing returns to S1603 and the same processing is repeated. On the other hand, in a case where the print processing of all the pages is completed, this processing is terminated.

At S1608 in a case where the received job is the sheet feed job, the sheet that is set to the inserter 108 is fed and discharged for each page. At next S1609, whether or not the feed/discharge processing of all the pages designated in the sheet feed job is completed is determined. In a case where there is a page for which the feed/discharge processing is not completed yet, the processing returns to S1608 and the same processing is repeated. On the other hand, in a case where the feed/discharge processing is completed for all the pages, this processing is terminated.

The above is the operation of the printing module 107.

Modification Example

In the above-described embodiment, it is premised that the setting value of the blank sheet saving function may be different between at the time of registration of a reference image and at the time of printing accompanied by inspection and by registering in advance the blank sheet image common to jobs as the reference image, the occurrence of inconsistency between collated pages in the inspection processing is prevented. However, in a case where it is possible to match the setting state of the blank sheet saving function in the printing module 107 between at the time of registration of a reference image and at the time of printing accompanied by inspection, it is also possible to similarly prevent the occurrence of inconsistency between collated pages in the inspection processing. Consequently, it may also be possible to disable the user operation so that the user cannot set the blank sheet saving function to ON in a case where, for example, the side of the inspection module 109 is in the reference image registration mode so that registration of a reference image is performed always including the blank sheet page. As a specific method, it is sufficient to, for example, gray out the item name of "Blank sheet saving" and the button 1503 for setting it on the Printer Setting screen 1500 described above so that a user cannot select them. At that time, it is sufficient to store the current setting value of blank sheet saving in the memory 224 and cancel the disabled state and return the setting value to the stored setting value in the stage where the registration processing of the reference image is completed. In a case where the control such as this performed, it is possible to omit the processing at S1305, S1309, and S1310 in the flowchart in FIG. 13 described previously. That is, in a case where the determination results at S1304 are No (determination that the read sheet is not the job switching sheet), it is sufficient to immediately cause the processing to advance to S1306 and determine whether the current reference image is a blank sheet image. In the case of the present modification example, it is possible to further simplify the operation control on the side of the inspection module 109.

As above, according to the present embodiment, it is made possible to prevent inconsistency from occurring in the collated pages between the reference image and the inspection image at the time of printing accompanied by inspection. Further, it is no longer necessary to register reference images in many patterns in accordance with the setting state of the blank sheet saving function on the side of the printing module 107, and therefore, this can contribute also to the reduction of load of a user.

Other Modification Examples

In the above-described embodiment, the operation of the setting of inspection conditions is performed by the inspection module 109 and the setting of the inspection job and the operation to give printing instructions are performed by the external controller 102, but the configuration is not limited to the configuration such as this. For example, it may also be possible to design a configuration in which the setting of inspection conditions, the setting of the inspection job, and the operation to give printing instructions are performed in an integrated manner by one of the external controller 102, the printing module 107, the inspection module 109, and the client PC 103.

Further, in the above-described embodiment, the data of the reference image is stored in the memory 239 of the inspection module 109, but the configuration may be one in which, for example, the data of the reference image is stored on a server accessible in common by each module.

Furthermore, in the above-described embodiment, at the time of registering a reference image, the dedicated job switching sheet as shown in FIG. 9A is used, but it is not necessarily required to use an independent job switching sheet. For example, as shown in FIG. 9B, it may also be possible to print an inspection-target image on a sheet one size larger than the sheet size designated in the inspection job and print a barcode associated with the reference image in the blank portion thereof. In this case, it is sufficient for the inspection module 109 to trim the image area, which is the reference image, and the barcode area, respectively, and store/register the image data. Further, in a case where an inspection job is performed in which a partition sheet is inserted between each bundle of a specific number of copies in order to perform management for each bundle, it may also be possible to add a barcode associated with a reference image to the top partition sheet. Due to this, it is possible to cause part of the partition sheet between bundles to function as a job switching sheet.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, in a printing system that incorporate an inspection device, it is possible to suppress the occurrence of a wasteful defective product by matching the collated pages between the reference image and the inspection image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-030020, filed Feb. 26, 2021 which is hereby incorporated by reference wherein in its entirety.

What is claimed is:

1. A printing system comprising:

a printer that performs print processing for each page based on a print job; and one or more controllers including one or more processors and one or more memories, the one or more controllers being configured to:

inspect a printing defect of a sheet for which print processing has been performed by collating a read image obtained by reading an image on the sheet for which the print processing has been performed based on the print job and a reference image registered in association with the print job;

perform a function to omit, in a case where a target page of the print processing is a blank sheet page, print processing thereof; and in the inspection, in a case where a read image obtained by reading an image on a sheet for which print processing has been performed based on the print job is a blank sheet image, match a page of the reference image and a page of the read image with each other by using a blank sheet image registered as the reference image not in association with the print job.

2. The printing system according to claim 1, wherein the one or more controllers are configured to match a page of the reference image and a page of the read image with each other by determining whether to use the blank sheet image registered as the reference image not in association with the print job based on a setting value of the function in the printing unit at the time of performing the inspection.

3. The printing system according to claim 2, wherein the one or more controllers are configured to determine, in a case where a setting value of the function in the printing unit at the time of performing the inspection is ON, a page of the read image is a blank sheet page, and a blank sheet image corresponding to the blank sheet page is not registered in advance as the reference image in association with the print job, the blank sheet image registered as the reference image not in association with the print job to be the reference image corresponding to a page of the read image.

4. The printing system according to claim 1, wherein the one or more controllers are configured to register a read image obtained by reading an image of a sample sheet for which print processing has been performed as the reference image in association with the print job and further register a read image obtained by reading an image of a blank sheet for which print processing has not been performed as the reference image not in association with a specific print job.

5. The printing system according to claim 4, comprising:

a graphical user interface for performing setting relating to the registration, wherein the graphical user interface has a setting area for registering a read image obtained by reading an image of the sample sheet for which print processing has been performed as the reference image in association with the print job and a setting area for registering a read image obtained by reading an image of the blank sheet for which print processing has not been performed as the reference image not in association with the specific print job.

6. A printing system comprising:

a printer that performs print processing for each page based on a print job; and one or more controllers including one or more processors and one or more memories, the one or more controllers being configured to:

register a read image obtained by reading an image of a sample sheet for which print processing has been performed as a reference image in association with the print job;

inspect a printing defect of a sheet for which print processing has been performed by collating a read image obtained by reading an image on the sheet for which the print processing has been performed based on the print job and a reference image registered in association with the print job, wherein the one or more controllers are configured to perform a function to omit, in a case where a target page of the print processing is a blank sheet page, print processing thereof and it is not possible to set a setting value of the function to ON at the time of performing print processing of the sample sheet for performing the registration.

7. The printing system according to claim 6, comprising:

a user interface for a user to perform setting of whether to set a setting value of the function to ON or OFF, wherein a user operation for the setting on the user interface is disabled at the time of performing print processing of the sample sheet for performing the registration.

8. The printing system according to claim 7, wherein the user interface is a graphical user interface and the disabling is implemented by graying out a display relating to the function on the graphical user interface.

9. The printing system according to claim 7, wherein the one or more controllers are configured to store a current setting value of the function at the time of the disabling into a storage, and on the user interface, in a case where the registration is completed, a setting value of the function is returned to the stored setting value as well as the disabling is cancelled.

10. A printing system comprising:

a printer that performs print processing for each page based on a print job; and one or more controllers including one or more processors and one or more memories, the one or more controllers being configured to:

inspect a printing defect of a sheet for which print processing has been performed by collating a read image obtained by reading an image on the sheet for which the print processing has been performed based on the print job and a reference image registered in association with the print job, wherein the one or more controllers are configured to perform a function to omit, in a case where a target page of the print processing is a blank sheet page, print processing thereof, and in a case where the function is ON at the time of registration of the reference image and the function is OFF at the time of inspection to perform collation with the reference image, a blank sheet image obtained by reading an image on a sheet for which print processing has been performed based on the print job is collated with a blank sheet image registered as the reference image not in association with the print job.

11. A printing system comprising:

a printer that performs print processing for each page based on a print job; and one or more controllers including one or more processors and one or more memories, the one or more controllers being configured to:

inspect a printing defect of a sheet for which print processing has been performed by collating a read image obtained by reading an image on the sheet for which the print processing has been performed based on the print job and a reference image registered in association with the print job, wherein the one or more controllers are configured to perform a function to omit, in a case where a target page of the print processing is a blank sheet page, print processing thereof, and in a case where the function is OFF at the time of registration of the reference image and the function is ON at the time of inspection to perform collation with the reference image, perform control so that an image obtained by reading an image on a sheet for which print processing has been performed based on the print job is not collated with a blank sheet image registered as the reference image.

12. A control method of controlling a printing system including a printer, the control method comprising:

performing print processing for each page based on a print job; and inspecting a printing defect of a sheet for which print processing has been performed by collating a read image obtained by reading an image on the sheet for which the print processing has been performed based on the print job and a reference image registered in association with the print job;

omitting, in a case where a target page of the print processing is a blank sheet page, print processing thereof; and in a case where a read image obtained by reading an image on a sheet for which print processing has been performed based on the print job is a blank sheet image matching a page of the reference image and a page of the read image with each other by using a blank sheet image registered as the reference image not in association with the print job.

13. A non-transitory computer readable storage medium storing a program for causing a computer to perform a control method of controlling a printing system including a printer, the control method comprising:

performing print processing for each page based on a print job; and inspecting a printing defect of a sheet for which print processing has been performed by collating a read image obtained by reading an image on the sheet for which the print processing has been performed based on the print job and a reference image registered in association with the print job;

omitting, in a case where a target page of the print processing is a blank sheet page, print processing thereof; and in a case where a read image obtained by reading an image on a sheet for which print processing has been performed based on the print job is a blank sheet image, matching a page of the reference image and a page of the read image with each other by using a blank sheet image registered as the reference image not in association with the print job.

* * * * *